(12) United States Patent
Lee et al.

(10) Patent No.: US 6,940,797 B1
(45) Date of Patent: Sep. 6, 2005

(54) APPARATUS AND METHOD OF COMPENSATING FOR TILT AND/OR DEFOCUS OF A DISC DURING RECORDING

(75) Inventors: Kyung-geun Lee, Seongnam (KR); Jung-wan Ko, Yongin (KR); Seong-sin Joo, Suwon (KR); In-sik Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 09/603,204

(22) Filed: Jun. 26, 2000

(30) Foreign Application Priority Data

Jun. 25, 1999 (KR) ............................................. 99-24297
Sep. 9, 1999 (KR) ............................................. 99-38398
Sep. 9, 1999 (KR) ............................................. 99-38399

(51) Int. Cl.$^7$ ............................................. G11B 7/00
(52) U.S. Cl. ............................... 369/53.19; 369/53.28; 369/59.12; 369/116
(58) Field of Search ......................... 369/53.19, 53.28, 369/59.12, 116, 59.11

(56) References Cited

U.S. PATENT DOCUMENTS

| | | | |
|---|---|---|---|
| 4,358,774 A | | 11/1982 | Wilkinson |
| 4,631,712 A | | 12/1986 | Matsubayashi et al. |
| 4,680,745 A | * | 7/1987 | Ota et al. ................. 369/44.23 |
| 4,710,908 A | | 12/1987 | Ohshima et al. |
| 5,327,411 A | * | 7/1994 | Iwasa et al. .................. 369/59 |
| 5,383,175 A | | 1/1995 | Finkelstein et al. |
| 5,446,716 A | * | 8/1995 | Eastman et al. ............... 369/54 |
| 5,449,590 A | * | 9/1995 | Imaino et al. ............... 430/273 |
| 5,450,383 A | * | 9/1995 | Call et al. .................... 369/116 |
| 5,452,272 A | * | 9/1995 | Murakami et al. ............. 369/13 |
| 5,483,512 A | * | 1/1996 | Yanagawa .................... 369/54 |
| 5,495,466 A | * | 2/1996 | Dohmeier et al. ....... 369/53.36 |
| 5,544,268 A | * | 8/1996 | Bischel et al. ................. 385/4 |
| 5,614,983 A | * | 3/1997 | Iwane et al. .................. 396/97 |
| 5,675,568 A | * | 10/1997 | Hajjar et al. ................ 369/116 |
| 5,699,342 A | * | 12/1997 | Yagi et al. ................... 369/116 |
| 5,838,646 A | | 11/1998 | Watanabe et al. |
| 5,848,045 A | * | 12/1998 | Kirino et al. ................ 369/116 |
| 5,903,537 A | * | 5/1999 | Gage et al. .................. 369/116 |
| 5,978,332 A | * | 11/1999 | Itakura et al. ............. 369/44.32 |
| 6,067,284 A | * | 5/2000 | Ikeda et al. .................. 369/116 |
| 6,072,762 A | * | 6/2000 | Kume et al. ................. 369/116 |
| 6,175,541 B1 | * | 1/2001 | Shoji et al. .................... 369/48 |
| 6,272,100 B1 | * | 8/2001 | Toda et al. .................. 369/116 |
| 6,304,366 B1 | * | 10/2001 | Scalora et al. ............... 359/328 |
| 6,345,034 B1 | * | 2/2002 | Kim ........................ 369/275.5 |
| 6,381,206 B1 | * | 4/2002 | Maeda ..................... 369/59.12 |

FOREIGN PATENT DOCUMENTS

| | | |
|---|---|---|
| EP | 0385498 | 9/1990 |
| JP | 60-020326 | 2/1985 |
| JP | 60-066341 | 4/1985 |
| JP | 62-008371 | 1/1987 |
| JP | 64-046231 | 2/1989 |
| JP | 01-150230 | 6/1989 |
| JP | 02-230515 | 9/1990 |
| JP | 03-022223 | 1/1991 |
| JP | 06-215438 | 8/1994 |
| JP | 06-295458 | 10/1994 |
| JP | 9-231569 | 9/1997 |
| JP | 11-273115 | 10/1999 |
| JP | 2000-3526 | 1/2000 |
| JP | 2000-003526 | 1/2000 |

* cited by examiner

*Primary Examiner*—Gautam R. Patel
(74) *Attorney, Agent, or Firm*—Stein, McEwen & Bui, LLP

(57) ABSTRACT

A method of compensating for tilt and/or defocus and an apparatus therefor. The apparatus has a tilt and/or defocus detector detecting the tilt and/or defocus of an optical recording medium, and a recording compensator compensating a write pulse having a predetermined recording pattern using a predetermined system with respect to the detected tilt and/or defocus. The apparatus both adjusts write power with respect to the detected defocus, shifts the recording pattern with respect to the detected tilt, adjusts a power level and/or write time required for recording, and records a recording mark having a desired size (length and width). The apparatus is useful in compensating for tilt and/or defocus in a high-density optical system.

28 Claims, 31 Drawing Sheets

FIG. 12A

| Pw (mW) | Tilt (deg) | Tmax (C) | L (nm) | W (nm) |
|---|---|---|---|---|
| 10 | 0 | 754.6 | 755.5 | 345.2 |
| 10 | 0.5 | 720.0 | 682.9 | 298.7 |
| 10 | 1.0 | 630.7 | 248.6 | 96.3 |
| 12 | 0 | 901.9 | 926.6 | 484.1 |
| 12 | 0.5 | 860.7 | 887.5 | 450.0 |
| 12 | 1.0 | 753.9 | 747.3 | 340.5 |
| 14 | 0 | 1048.9 | 1026.5 | 577.9 |
| 14 | 0.5 | 1000.7 | 997.7 | 548.7 |
| 14 | 1.0 | 876.6 | 907.1 | 459.8 |

FIG. 12B

| Pw (mW) | Tilt (deg) | Tmax (C) | L (nm) | W (nm) |
|---|---|---|---|---|
| 5 | 0 | 834.0 | 518.1 | 277.9 |
| 5 | 0.3 | 778.1 | 493.8 | 240.9 |
| 5 | 0.6 | 648.7 | 381.0 | 156.6 |
| 6 | 0 | 987.1 | 575.8 | 325.6 |
| 6 | 0.3 | 919.2 | 551.3 | 310.6 |
| 6 | 0.6 | 755.3 | 479.9 | 238.1 |
| 7 | 0 | 1141.9 | 615.0 | 368.6 |
| 7 | 0.3 | 1062.2 | 590.7 | 356.0 |
| 7 | 0.6 | 867.9 | 537.3 | 282.2 |

FIG. 15A

| Pw (mW) | Tilt (deg) | Tmax (C) | L (nm) | W (nm) |
|---|---|---|---|---|
| 4Tw | 0 | 895.8 | 853.8 | 477.1 |
| | 0.5 | 853.8 | 814.5 | 441.6 |
| | 1.0 | 747.6 | 673.2 | 330.6 |
| 4.5Tw | 0 | 901.9 | 926.6 | 484.1 |
| | 0.5 | 860.7 | 887.5 | 450.0 |
| | 1.0 | 753.9 | 747.3 | 340.5 |
| 5Tw | 0 | 908.7 | 998.2 | 490.3 |
| | 0.5 | 866.2 | 959.1 | 456.8 |
| | 1.0 | 759.5 | 820.1 | 347.3 |

FIG. 15B

| Pw (mW) | Tilt (deg) | Tmax (C) | L (nm) | W (nm) |
|---|---|---|---|---|
| 4Tw | 0 | 980.6 | 538.2 | 323.8 |
| | 0.5 | 912.0 | 512.0 | 303.4 |
| | 1.0 | 748.9 | 441.0 | 229.5 |
| 4.5Tw | 0 | 987.1 | 575.8 | 325.6 |
| | 0.5 | 919.2 | 551.3 | 310.6 |
| | 1.0 | 755.3 | 479.9 | 238.1 |
| 5Tw | 0 | 993.3 | 612.3 | 329.0 |
| | 0.5 | 925.2 | 592.7 | 315.2 |
| | 1.0 | 760.1 | 516.3 | 241.2 |

FIG. 18

| Tilt / Pw | | 0° | 0.5° | 0.5°+0.25μm DEFOCUS |
|---|---|---|---|---|
| 6mW | SHIFT OF RECORDING POSITION | 0 | 0.293 | 0.293 |
| | LENGTH | 0.515 | 0.439 | 0.439 |
| | WIDTH | 0.231 | 0.174 | 0.174 |
| 7mW | SHIFT OF RECORDING POSITION | — | 0.262 | 0.262 |
| | LENGTH | | 0.496 | 0.496 |
| | WIDTH | | 0.214 | 0.214 |
| 8mW | SHIFT OF RECORDING POSITION | — | 0.245 | 0.704 |
| | LENGTH | | 0.535 | 0.090 |
| | WIDTH | | 0.242 | 0.051 |
| 9mW | SHIFT OF RECORDING POSITION | — | — | 0.700 |
| | LENGTH | | | 0.372 |
| | WIDTH | | | 0.107 |

FIG. 22

| Pw | Tilt<br>MEASURED ITEM | 0° | 0.5° | 1.0° |
|---|---|---|---|---|
| 6mW | SHIFT OF RECORDING POSITION | 0 | 0.293 | NO RECORD |
| | LENGTH | 0.515 | 0.439 | |
| | WIDTH | 0.231 | 0.174 | |
| 7mW | SHIFT OF RECORDING POSITION | | 0.262 | |
| | LENGTH | | 0.496 | |
| | WIDTH | | 0.214 | |
| 8mW | SHIFT OF RECORDING POSITION | | 0.245 | 0.704 |
| | LENGTH | | 0.535 | 0.090 |
| | WIDTH | | 0.242 | 0.051 |
| 9mW | SHIFT OF RECORDING POSITION | | | 0.700 |
| | LENGTH | | | 0.372 |
| | WIDTH | | | 0.107 |

APPARATUS AND METHOD OF COMPENSATING FOR TILT AND/OR DEFOCUS OF A DISC DURING RECORDING

CROSS-REFERENCE TO RELATED APPLICATIONS

This application claims the benefit of Korean Application Nos. 99-24297, filed Jun. 25, 1999; 99-38398, filed Sep. 9, 1999; and 99-38399, filed Sep. 9, 1999, in the Korean Industrial Property Office, the disclosures of which are incorporated herein by reference.

BACKGROUND OF THE INVENTION

1. Field of the Invention

The present invention relates to a method of compensating for tilt and/or defocus and an apparatus therefor, and more particularly, to a method of compensating for tilt and/or defocus by controlling the power and/or time required for recording according to the amount of tilt and/or defocus of an optical recording medium, and an apparatus therefor.

2. Description of the Related Art

When tilt or defocus occurs, or tilt and defocus occur at the same time in an optical disc which requires high density recording using a blue light laser, the effect of the tilt and/or defocus increases in comparison to the effect on a low density recording, which uses a red light laser. Therefore, a method of compensating for the effect is required.

When both an objective lens with a large numerical aperture (NA) and a blue light laser using a 400 nm short wavelength is used instead of using an existing red light laser (650 nm wavelength) in order to obtain a higher density, a system is affected as shown in Table 1, as follows. The factor which most affects recording is a reduction in the margin according to the increase in tilt and a shallowing of the focal depth.

TABLE 1

| Item | Effect | NA 0.6 | NA 0.65 | NA 0.85 | Effect in NA 0.6 NA 0.85 |
|---|---|---|---|---|---|
| Spot diameter (relative size) | λ/NA | 1 | 0.93 | 0.70 | Capacity doubled |
| Focal depth (relative depth) | λ/NA² | 1 | 0.85 | 0.50 | Servo control bandwidth doubled |
| Disc tilt (relative margin amount) | λ/tNA³ | 1 | 0.79 | 0.35 | Strict disc tilt allowance |
| Disc thickness change (relative allowance) | λ/NA⁴ | 1 | 0.73 | 0.25 | Strict thickness allowance in disc manufacturing |

In addition, tolerances for radial tilt and tangential tilt in a current digital versatile disc-random access memory (DVD-RAM) are 0.7° and 0.3°, respectively. The basic characteristics of a disc must be met while remaining within these tolerances. Thus, for example, power, such as write power and erase power, must be maintained at a level which is sufficient to obtain the write characteristics defined in a disc specification.

However, when a blue light laser using a short wavelength (400 nm) is used to meet the increasing demand for high density recording, the effect of tilt becomes greater. That is, when a higher NA is used in order to obtain the same substrate thickness and high density, the value of coma aberration becomes much greater. Equation 1 expresses the coma aberration as follows:

$$\text{Comma Aberration} = \left(\frac{n^2-1}{2n^3} * d * \frac{NA^3}{\text{wavelength}}\right) * \left(\text{tilt} * \frac{\pi}{180}\right) \quad (1)$$

where, n is the refractivity of a substrate, d is the thickness of the substrate, and NA is the numerical aperture of an objective lens.

FIG. 1 illustrates coma aberration in three dimensions according to wavelength and NA, when the thickness of a substrate is 0.6 mm, the refractivity of a substrate is 1.5, and tilt is 0.5°, using the equation 1. The figure shows that coma aberration increases as wavelength becomes shorter and numerical aperture becomes greater.

FIG. 2 illustrates the changes in beam peak intensity with respect to tilt. According to FIG. 2, as tilt increases, the recording beam peak intensity decreases at a wavelength of 400 nm more rapidly than at a wavelength of 650 nm. If recording is performed under this condition, the desired length and width of a recording mark cannot be recorded. As the NA increases, beam peak intensity decreases even at the same wavelength of 400 nm and 0.6 mm substrate thickness (t).

FIG. 3 illustrates changes in beam spot size with respect to tilt the beam spot size normalized by the beam size when tilt is 0° (Beam width$_{tilt}$/beam width$_{tilt=0}$). The figure shows that as tilt increases, spot size increases more at a wavelength of 400 nm than at a wavelength of 650 nm, and, as NA increases, spot size increases even at the same wavelength of 400 nm.

FIG. 4 illustrates changes in the maximum temperature-to-write power ratio (Tmax) with respect to tilt, with Tmax normalized by Tmax when tilt of 0° (Tmax$_{tilt}$/Tmax$_{tilt=0}$). The figure shows that as tilt increases, Tmax decreases more rapidly at a wavelength of 400 nm than at a wavelength of 650 nm, and, as write power ($P_w$) increases, Tmax decreases even at the same wavelength of 400 nm, while at a wavelength of 650 nm, Tmax is insensitive to changes in write power ($P_w$).

In addition, as the luminance effect of a short wavelength laser diode decreases when the power emitted therefrom changes according to the temperature change, the laser diode must emit luminance stably in order to read information recorded on a disc without error and to increase the reliability of an optical disc system.

FIG. 5 illustrates changes in Tmax with respect to tilt with Tmax normalized by Tmax for a tilt of 0° (Tmax$_{tilt}$/Tmax$_{tilt=0}$). As in FIG. 4, FIG. 5 shows that as tilt increases, Tmax decreases more rapidly at a wavelength of 400 nm than at a wavelength of 650 nm. In addition, as write time ($T_w$) increases, Tmax decreases even at the same wavelength of 400 nm, while at a wavelength of 650 nm, Tmax is insensitive to changes in ($T_w$).

Accordingly, since beam intensity decreases rapidly and the beam spot size increases at a wavelength of 400 nm with respect to tilt, the desired length and width of a recording mark cannot be obtained when recording, and therefore, power density ultimately decreases. In addition, when recording is performed on a disc that requires high density, a 400-nm wavelength laser beam is used and tilt compensation is required since the required temperature for forming an amorphous mark decreases rapidly with respect to tilt as shown in FIGS. 4 and 5.

One known method of compensating for tilt extends the tilt margin by, during disc manufacture, thinning the substrate thickness, which is currently 0.6 mm. However, since having a substrate thickness less than 0.6 mm causes problems in manufacturing and in disc characteristics, tilt compensation cannot be performed simply by manufacturing a substrate thinner than 0.6 mm. In addition, as the focal depth of the incidence beam becomes shallower, the defocus margin becomes smaller, which causes recording problems since recording is sensitive to even a small degree of defocus. This will now be explained referring to FIGS. 6 and 7, showing beam intensity and spot size, respectively, with respect to defocus in red wavelength and blue wavelength.

FIG. 6 illustrates changes in beam peak intensity with respect to defocus, and with the beam peak intensity normalized by beam peak intensity when defocus is 0°. As defocus increases, incidence beam intensity decreases more rapidly at a wavelength of 400 nm and 0.65 NA than at a wavelength of 650 nm and 0.6 NA. When recording is performed in this condition, the desired length and width of a recording mark cannot be recorded. In addition, as NA increases, beam intensity decreases even in the same wavelength.

FIG. 7 illustrates changes in beam spot size with respect to defocus, with spot size normalized by spot size when defocus is 0. As defocus increases, spot size increases more at a wavelength of 400 nm than at a wavelength of 650 nm. As NA increases, spot size increases even for the same wavelength.

Therefore, like the effect of tilt, defocus affects both the peak intensity and the spot size such that normal recording cannot be performed. In addition, simultaneous occurrence of defocus and tilt is a more serious problem. The beam shape, peak intensity, and spot size in the simultaneous occurrence of defocus and tilt are shown in FIGS. 8 and 9.

FIG. 8 illustrates changes in beam profile when both defocus and tilt occur at the same time. Curve 1 shows a normal-state beam shape; curve 2 shows the beam shape when defocus is 0.25 $\mu$m; curve 3 shows the beam shape when defocus is 0.5 $\mu$m; curve 4 shows the beam shape when tilt is 0.5°; curve 5 shows the beam shape when tilt is 0.5° and defocus is 0.25 $\mu$m; and curve 6 shows the beam shape when tilt is 0.5° and defocus is 0.5 $\mu$m.

FIG. 9 illustrates changes in beam spot size and peak power intensity when defocus and tilt occur at the same time. The abscissa shows a normal case 1, a case 2 where defocus is 0.25 $\mu$m, a case 3 where defocus is 0.5 $\mu$m, a case 4 where tilt is 0.5°, a case 5 where tilt is 0.5° and defocus is 0.25 $\mu$m, and a case 6 where tilt is 0.5° and defocus is 0.5 $\mu$m. The ordinate shows both the normalized value of peak intensity when tilt and defocus occur for peak intensity in a normal state, and the normalized value of spot size when tilt and defocus occur for spot size in a normal state. As defocus and/or tilt increase, peak power intensity decreases, and spot size increases. Peak power intensity decreases more, and spot size increases more, when tilt and defocus occur at the same time than when they occur individually.

As shown in FIGS. 8 and 9, when tilt and defocus occur at the same time, the effect is more serious than when tilt or defocus occurs singly. Accordingly, there is a need to compensate for tilt and/or defocus while performing high density recording.

SUMMARY OF THE INVENTION

To solve the above problems, it is an object of the present invention to provide a method of compensating for tilt in which recording is performed by adjusting power and/or time used for recording with respect to the tilt of an optical recording medium.

It is another object to provide a method of adaptively compensating for a write pulse with respect to the detected tilt of an optical recording medium.

It is another object to provide a method of adaptively compensating for a write pulse with respect to the detected defocus of an optical recording medium.

It is another object to provide a method of compensating for tilt and defocus in which recording is performed by adjusting power and/or time required for recording with respect to the tilt and defocus of an optical recording medium.

It is another object to provide a method of compensating for detected tilt after detected defocus is compensated.

It is another object to provide a method of adaptively compensating for the recording pattern of a write pulse with respect to detected tilt and/or defocus of an optical recording medium.

It is another object to provide an apparatus for compensating for tilt in which recording is performed by adjusting the power and/or time used for recording with respect to tilt of an optical recording medium.

It is another object to provide an apparatus for adaptively compensating for a write pulse with respect to the detected tilt of an optical recording medium.

It is another object to provide an apparatus for compensating for tilt and/or defocus in which recording is performed by adjusting power and/or time required for recording with respect to tilt and/or defocus of an optical recording medium.

It is another object to provide an apparatus for compensating for detected tilt after detected defocus is compensated.

It is another object to provide an apparatus for adaptively compensating for the recording pattern of a write pulse according to the detected tilt and/or defocus of an optical recording medium.

Additional objects and advantages of the invention will be set forth in part in the description which follows and, in part, will be obvious from the description, or may be learned by practice of the invention.

To accomplish the above objects of the present invention, there is provided a method of compensating for tilt of an optical recording medium, the method including detecting the tilt of the optical recording medium; and compensating a recording signal having a predetermined recording pattern using a predetermined scheme with respect to the detected tilt.

To accomplish another of the objects of the present invention, there is provided a method for compensating for defocus of an optical recording medium which can record and rewrite data, the method including detecting the defocus of the optical recording medium; and performing compensating recording by a predetermined scheme with respect to the detected defocus.

To accomplish another of the objects of the present invention, there is provided a method of compensating for tilt and defocus of an optical recording medium, the method including detecting defocus of the optical recording medium; compensating for a write pulse having a predetermined recording pattern by a predetermined scheme with respect to detected defocus; detecting the tilt of the optical recording medium; and compensating write pulse having a predetermined recording pattern with respect to the detected tilt.

To accomplish another of the objects of the present invention, there is provided an apparatus for compensating for tilt which records and/or reproduces information on an optical recording medium, the apparatus having a tilt detector for detecting the tilt of an optical recording medium; and a recording compensator for compensating the recording signal having a predetermined recording pattern, using a predetermined scheme with respect to tilt detected by the tilt detector.

To accomplish another of the objects of the present invention, there is provided an apparatus for compensating for tilt and/or defocus which records and/or reproduces information on an optical recording medium, the apparatus having a tilt and/or defocus detector for detecting the tilt and/or defocus of an optical recording medium; and a recording compensator for compensating for the recording pulse having a predetermined recording pattern, using a predetermined scheme with respect to tilt and/or defocus detected by the tilt and/or defocus detector.

BRIEF DESCRIPTION OF THE DRAWINGS

The above objects and advantages of the present invention will become more apparent by describing in detail preferred embodiments thereof with reference to the attached drawings in which:

FIG. 12A is a table showing changes in the maximum temperature, the length of a recording mark, and the width of a recording mark for each write power with respect to tilt when the wavelength is 650 nm, and FIG. 12B is a table for the same when the wavelength is 400 nm;

FIG. 15A is a table showing changes in the maximum temperature, the length of a recording mark, and the width of a recording mark for each write time with respect to tilt when the wavelength is 650 nm, and FIG. 15B is a table showing the same when the wavelength is 400 nm;

FIG. 18 is a table showing changes in the shift amount of a write pulse, the length of a recording mark and the width of a recording mark for each write power with respect to tilt and/or defocus;

FIG. 22 is a table showing changes in the shift amount of a recording pulse, the length of a recording mark and the width of a recording mark for each write power with respect to tilt;

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
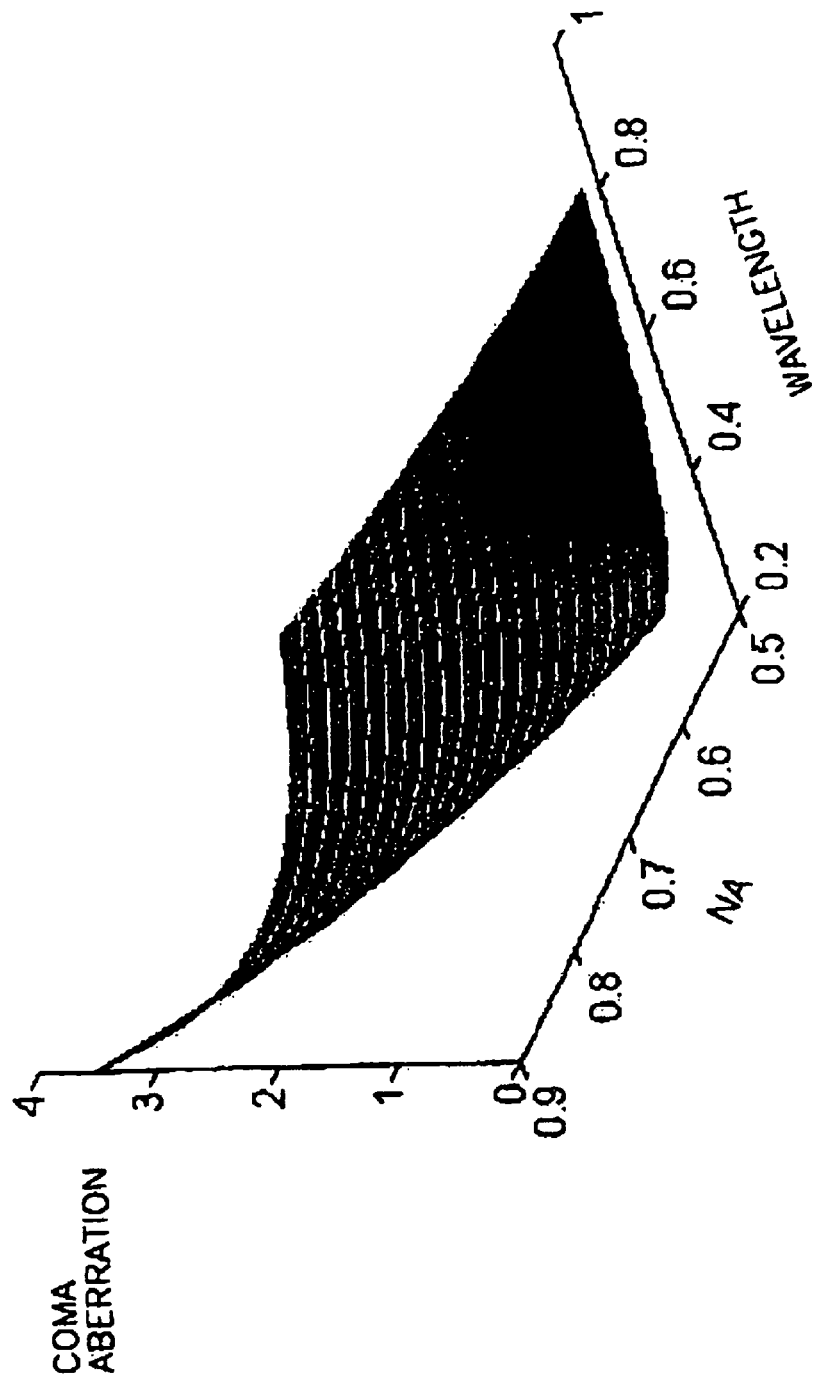
FIG. 1 illustrates coma aberration with respect to wavelength and numerical aperture (NA)
Figure 2:
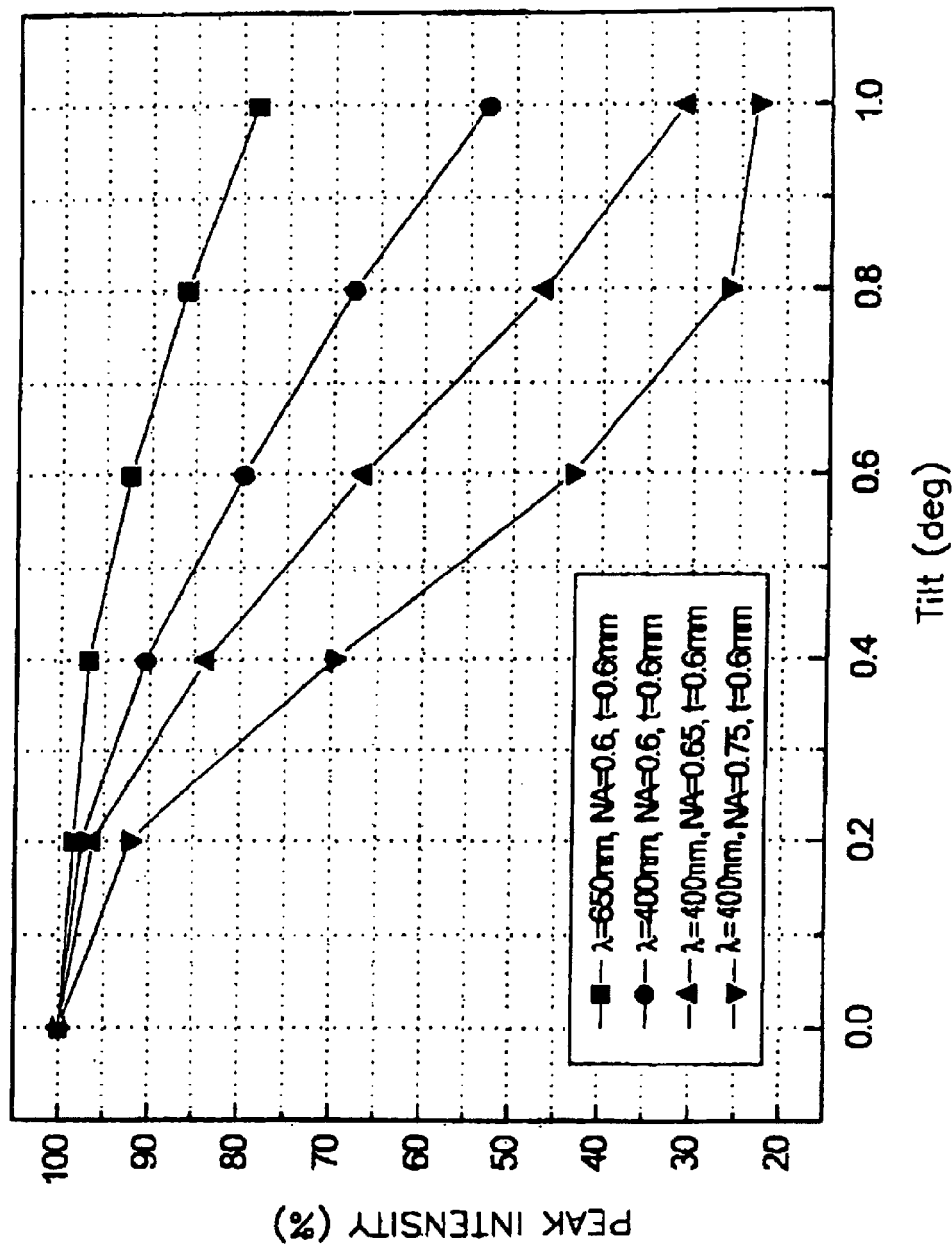
FIG. 2 illustrates changes in peak intensity with respect to tilt.

As shown in FIG. 2, when tilt occurs, the incidence beam peak intensity rapidly decreases when the wavelength is 400 nm. Therefore, it is necessary to compensate for write power and also to compensate for erase power, to a degree.

Figure 3:
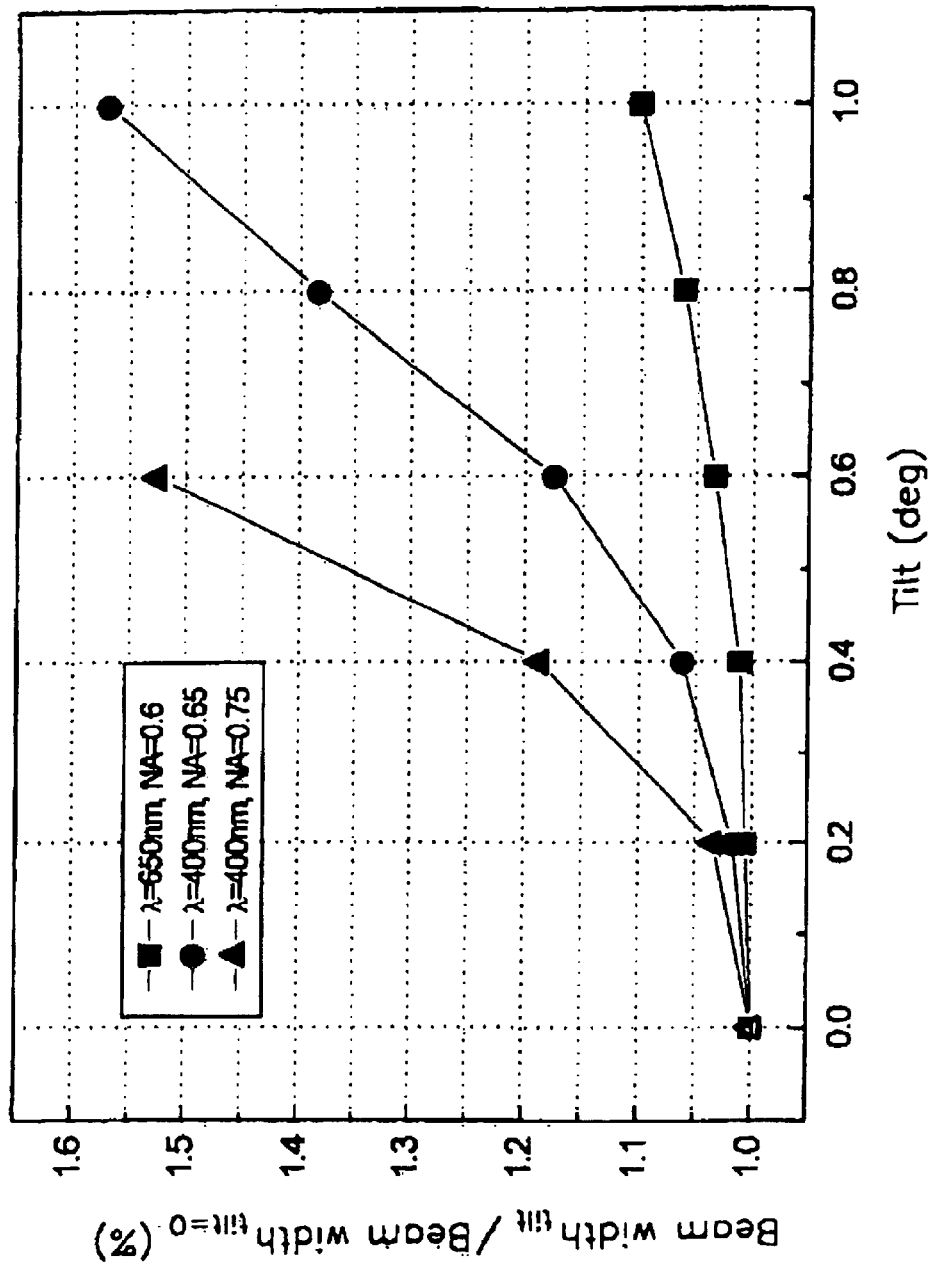
FIG. 3 illustrates changes in spot size with respect to tilt.

In addition, as shown in FIG. 3, the increase in beam spot size with respect to tilt is moderate at a wavelength of 650 nm, but the increase is rapid at a wavelength of 400 nm. For example, referring to FIG. 3, the same spot size found at a wavelength of 650 nm and a tilt of 1° also occurs at a tilt of 0.3° when the wavelength is 400 nm and the NA is 0.75. Therefore, at 400 nm, beam peak intensity decreases while beam spot size increases, which causes a reduction in power density.

Figure 4:
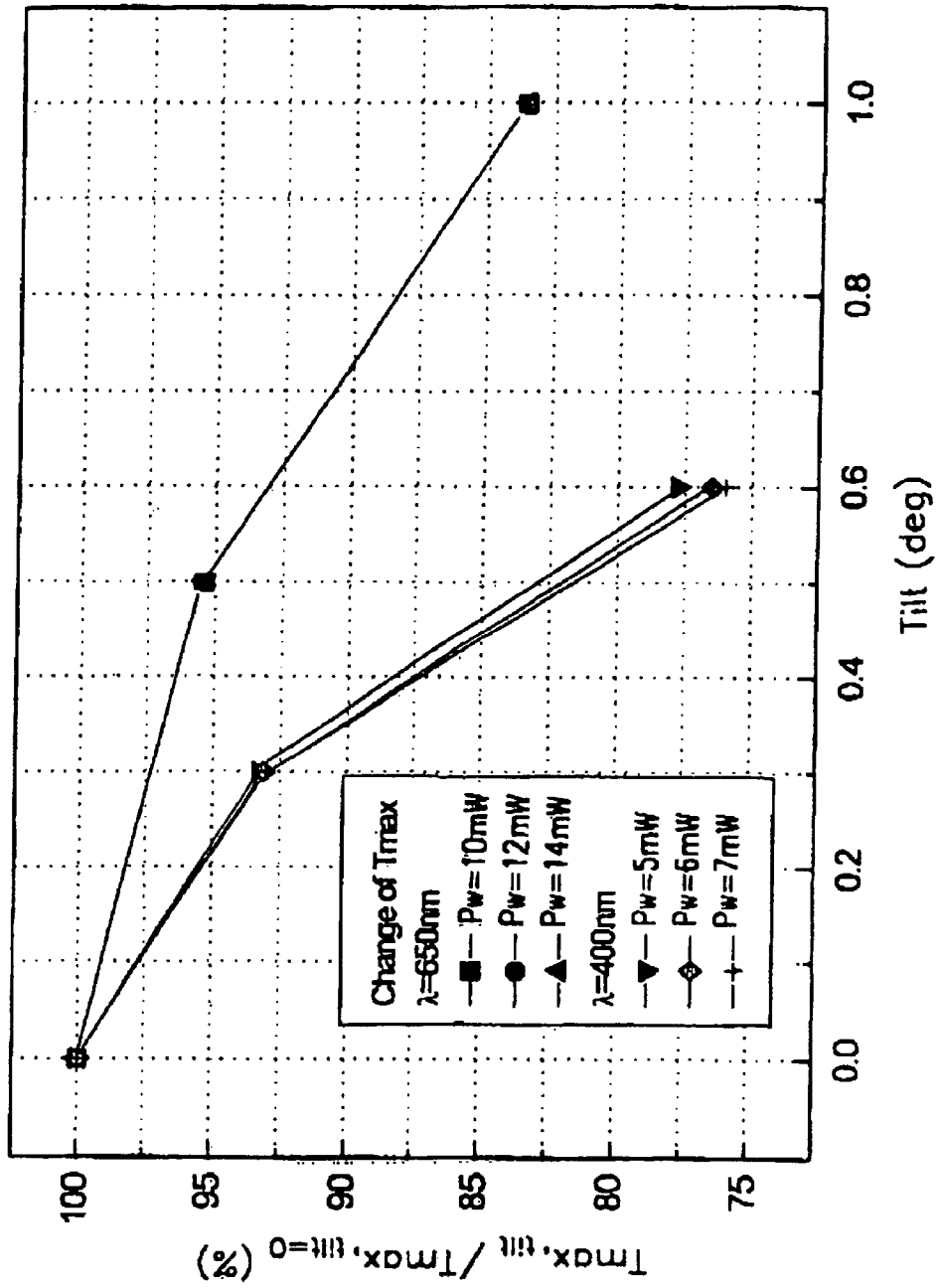
FIG. 4 illustrates changes in a maximum temperature-to-write power ratio with respect to tilt.
Figure 5:
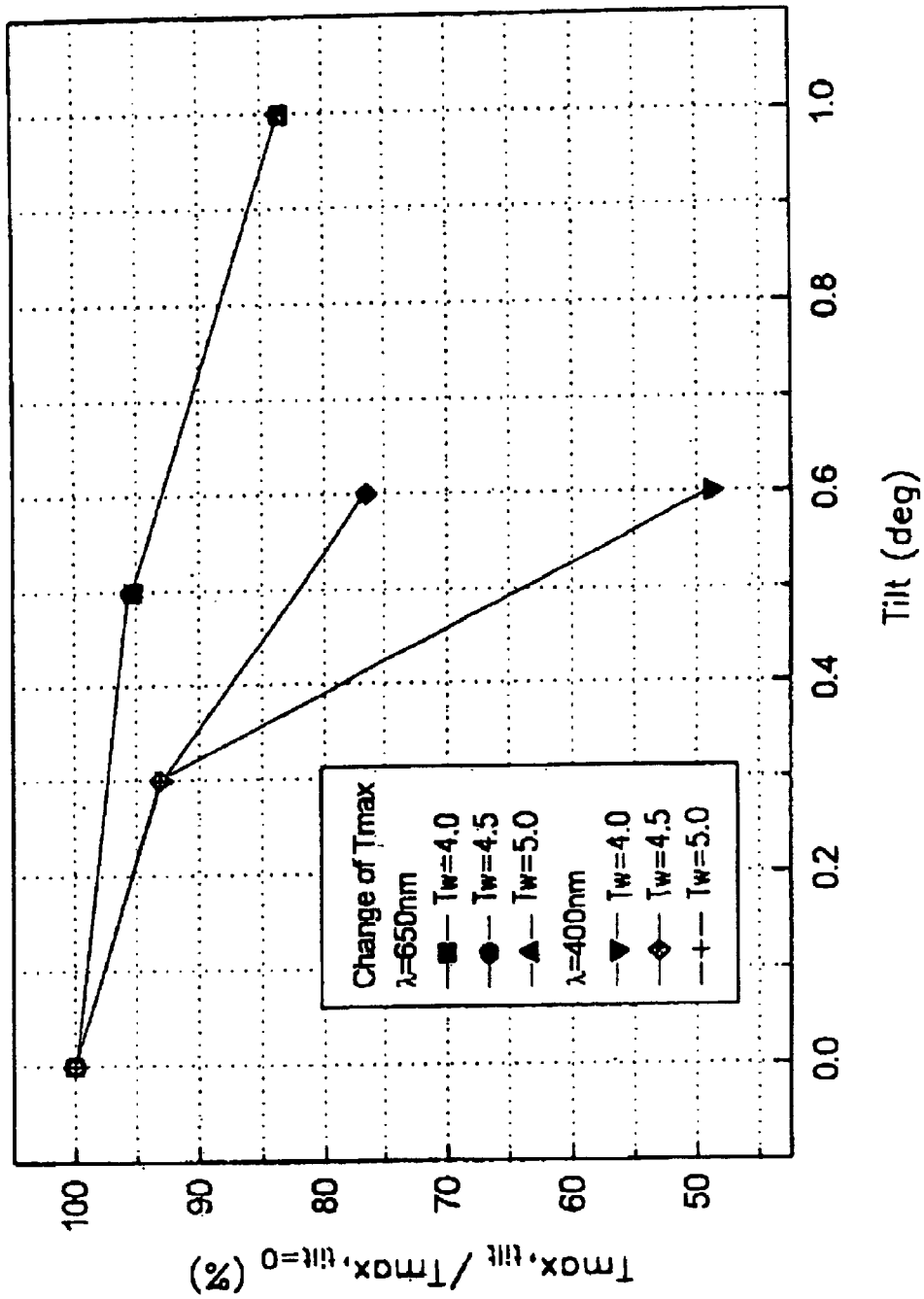
FIG. 5 illustrates changes in a maximum temperature-to write time ratio with respect to tilt.

FIGS. 4 and 5 show that a decrease in the maximum temperature with respect to tilt is more rapid at a wavelength of 400 nm than at a wavelength of 650 nm. This result shows that, when recording at the same tilt, there is a prominent energy reduction which is required to form a recording mark for a wavelength of 400 nm.

Figure 10:
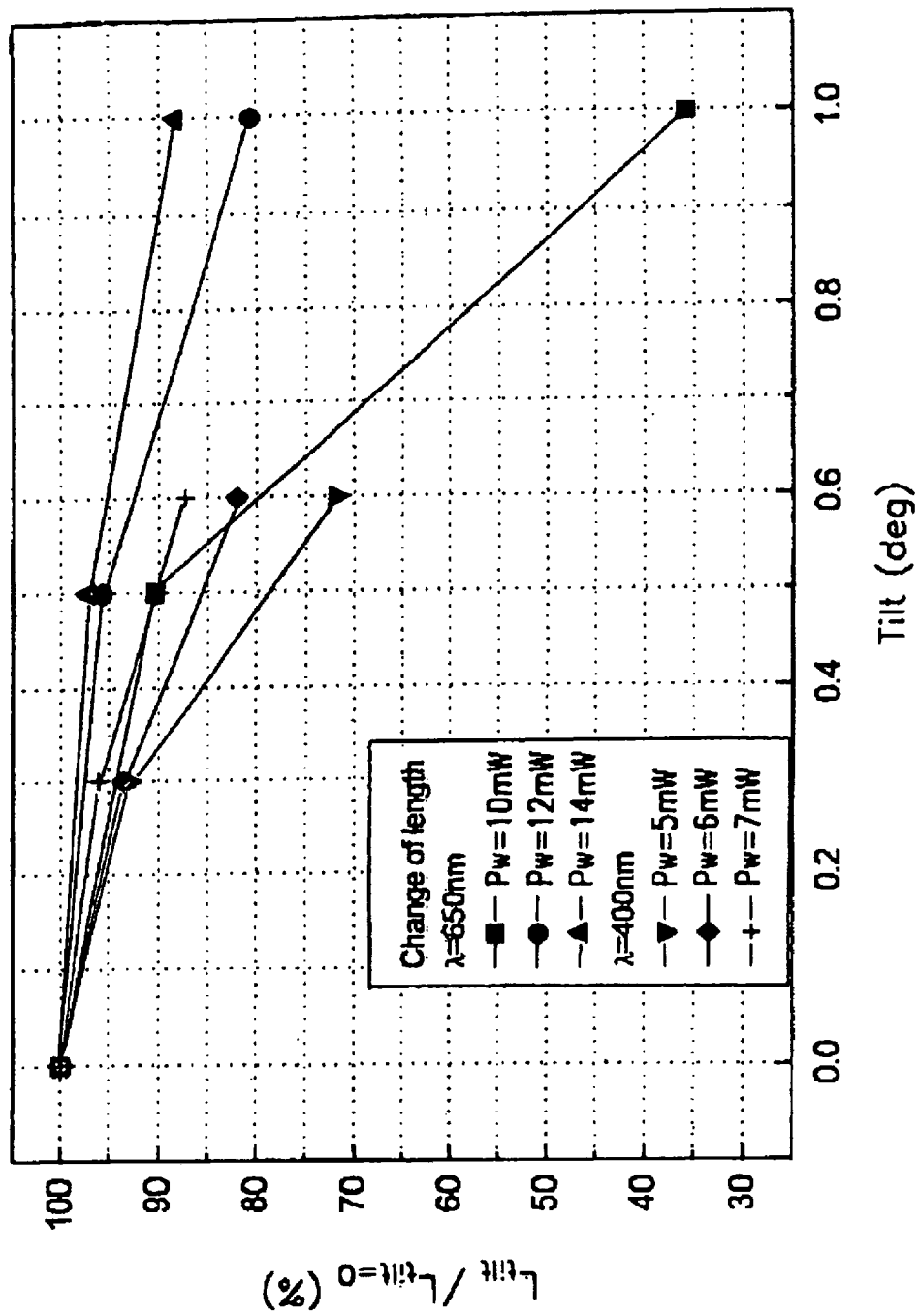
FIG. 10 illustrates changes in the recording mark length-to-write power ratio with respect to the tilt.
Figure 11:
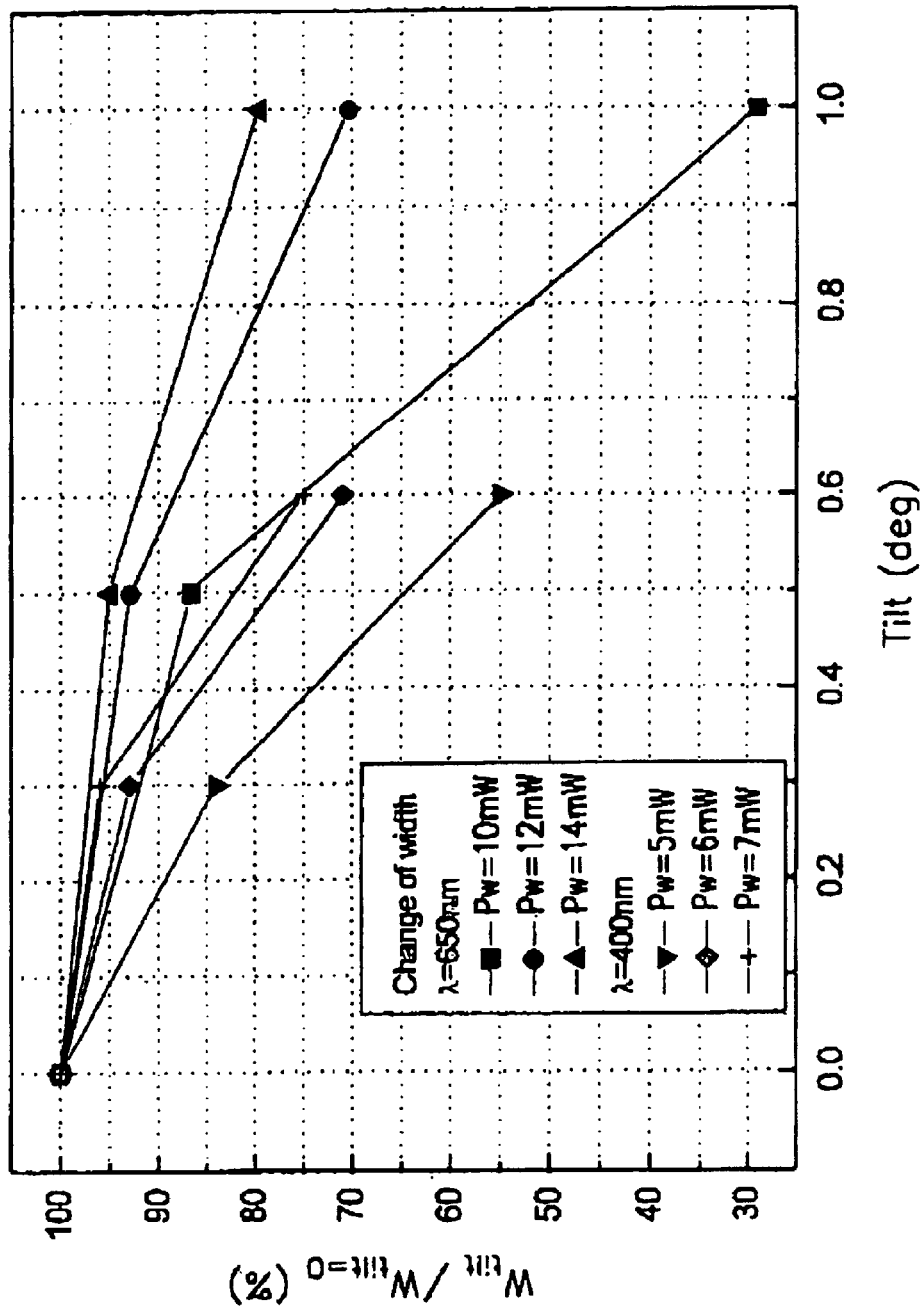
FIG. 11 illustrates changes the recording mark width-to-write power ratio with respect to the tilt.

FIGS. 10 and 11 show changes with respect to tilt by measuring the length and width of recording marks in order to compare recording mark shapes with respect to write power at a wavelength of 650 nm and at a wavelength of 400 nm, respectively. The figures show changes in length (L) and width (W) of the recording mark with respect to write power ($P_W$) at a wavelength of 650 nm and at a wavelength of 400 nm. Specifically, FIG. 10 illustrates the change in the recording mark length-to-write power ratio with respect to tilt, with the recording mark length normalized by the length when tilt is 0° ($L_{tilt}/L_{tilt=0}$), FIG. 10 shows that, as tilt increases, the length of a recording mark (L) decreases more at the wavelength of 400 nm than at the wavelength of 650 nm, and as write power ($P_W$) decreases, the length of the recording mark (L) decreases even at the same wavelength of 400 nm. In addition, FIG. 11 illustrates changes in the recording mark width-to-write power ratio with respect to tilt, with the recording mark width normalized by the recording mark width when tilt is 0° ($W_{tilt}/W_{tilt=0}$) FIG. 11 shows that, as tilt increases, the width of recording mark (W) decreases more at a wavelength of 400 nm than at a wavelength of 650 nm, and as write power ($P_w$) decreases, the width of the recording mark decreases even at the same wavelength of 400 nm. Therefore, the results in FIGS. 10 and 11 show that the decrease in the recording mark length is greater than the decrease in the width, and the decrease at a wavelength of 400 nm is greater than that at a wavelength of 650 nm, when the shape of a recording mark changes with respect to tilt.

For example, the results in FIGS. 10 and 11 show that, when the wavelength is 400 nm and tilt is 0.6°, by changing the write power from 5 mW to 7 mW, the recording mark length decreases by about 72% to 88%, and recording mark width decreases by about 55% to 75%. That is, the results show that the size of a recording mark can be compensated for by compensating the write power. Therefore, a writing strategy can be developed to control the recording waveform utilized for recording data applied to an optical disc system, with compensation being performed by using additional power, such as erase power or write power, to nearly eliminate the effect of tilt.

FIGS. 12A and 12B show tables of changes in the maximum temperature, and in the length and the width of a recording mark for each write power with respect to tilt. The table shown in FIG. 12A shows the changes when the wavelength is 650 nm, and the table shown in FIG. 12B shows the changes when the wavelength is 400 mm.

In addition, based on the detected tilt, compensation can be performed using write time. Thus, for example, the recording mark length can be compensated by adjusting the write time. Therefore, by appropriately adjusting the power level and recording time, tilt compensation is performed so that a recording mark with desired length and width can be recorded.

Figure 13:
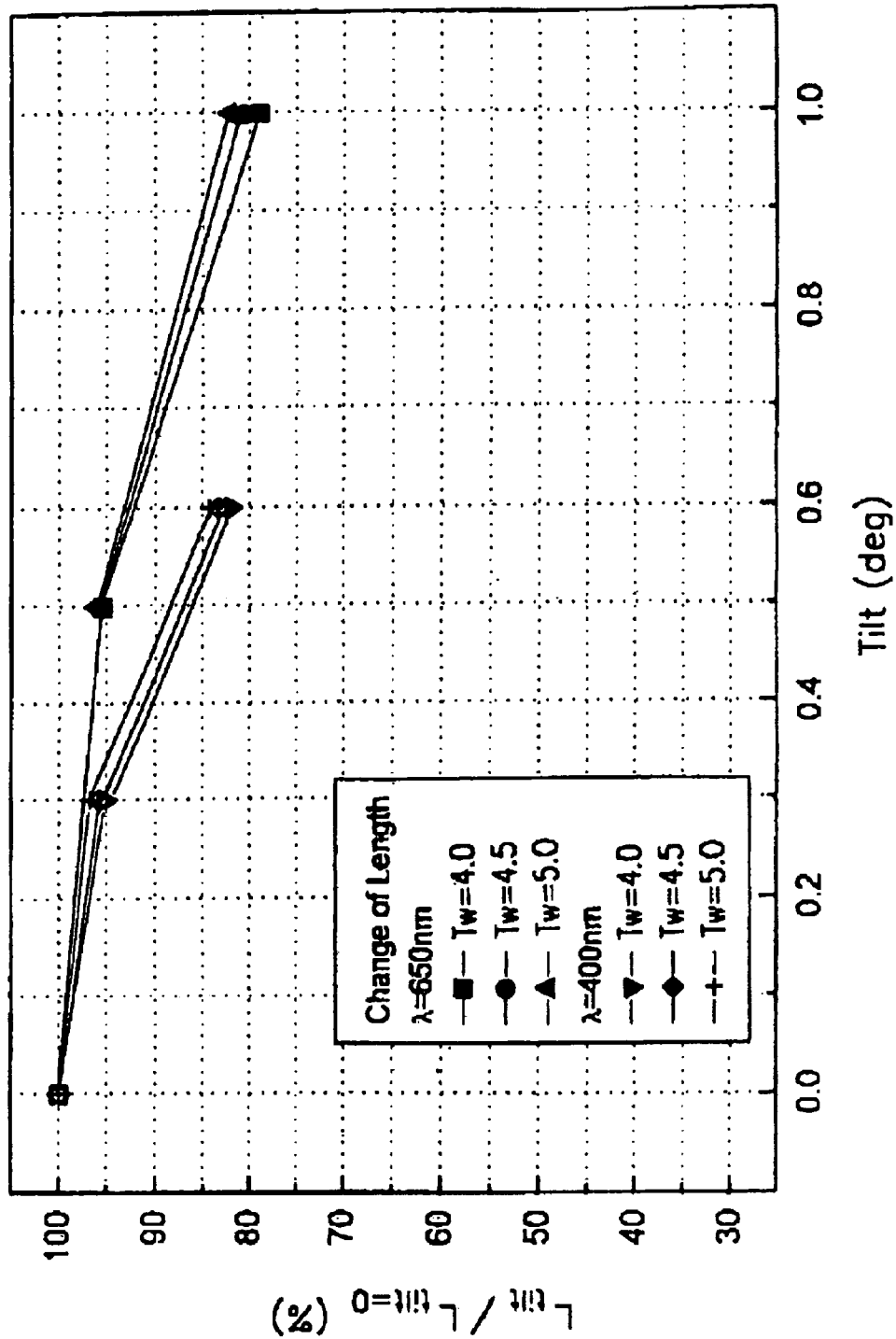
FIG. 13 illustrates changes in the recording mark length-to-write time ratio with respect to the tilt.

FIG. 13 shows changes in the recording mark length for different write times ($T_W$) with respect to tilt, with the recording mark length normalized by the recording mark for a tilt of 0° ($L_{tilt}/L_{tilt=0}$). The figure shows that, as tilt increases, the recording mark length decreases more at a wavelength of 400 nm than at a wavelength of 650 nm. In addition, as write time ($T_W$) decreases, the recording mark length (L) decreases even at the same wavelength of 400 nm.

Figure 14:
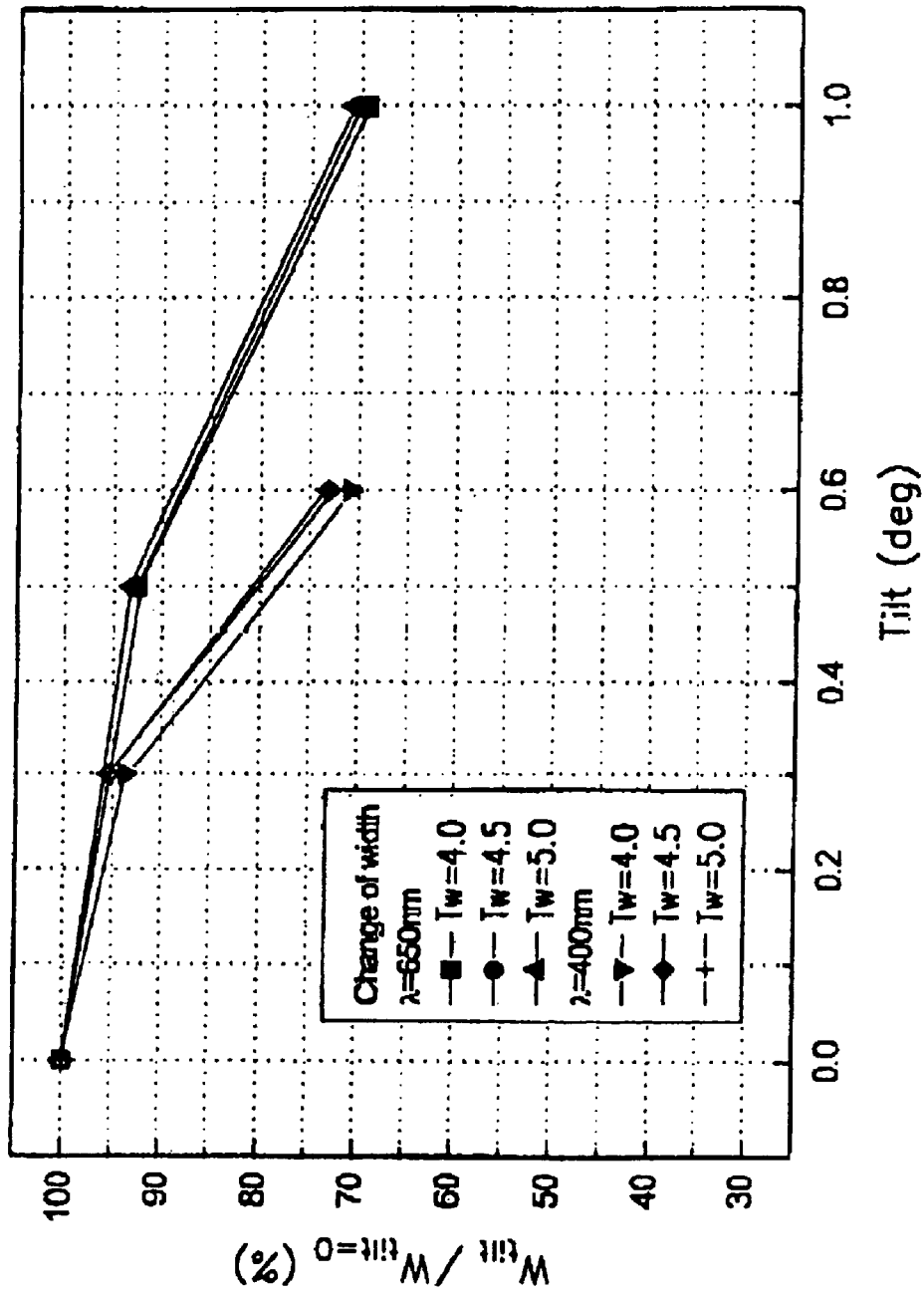
FIG. 14 illustrates changes in the recording mark width-to-write time ratio with respect to tilt.

FIG. 14 shows changes in the recording mark width for different write times ($T_W$) with respect to tilt, with the recording mark width normalized by the recording mark for a tilt of 0° ($W_{tilt}/W_{tilt=0}$). The figure shows that, as tilt increases, the recording mark width decreases more at a wavelength of 400 nm than at a wavelength of 650 nm. In addition, as write time ($T_W$) decreases, the width of a recording mark (L) decreases even at the same wavelength of 400 nm.

FIGS. 15A and 15B show tables of changes in the maximum temperature, and in the length and the width of a recording mark for each write time ($T_W$) with respect to tilt. The table shown in FIG. 15A shows the changes when the wavelength is 650 nm, and the table shown in FIG. 15B shows the changes when the wavelength is 400 mm.

Figure 6:
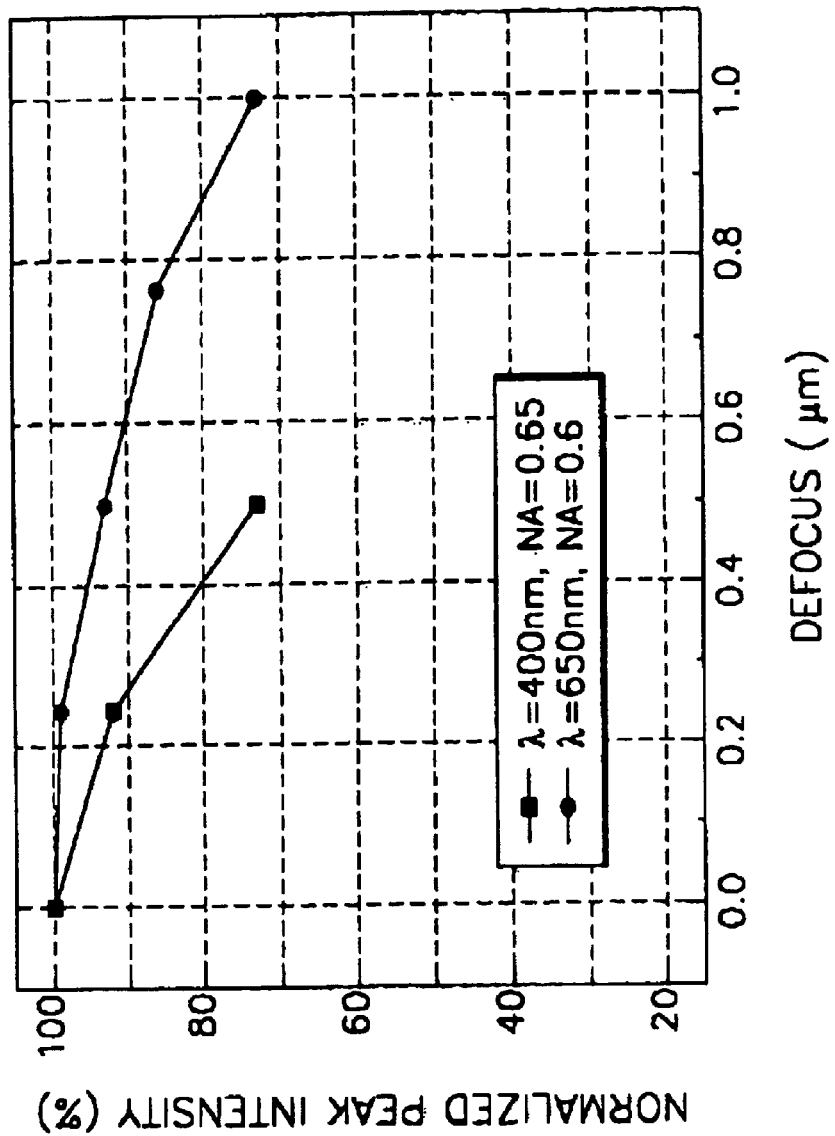
FIG. 6 illustrates changes in peak intensity with respect to defocus.
Figure 7:
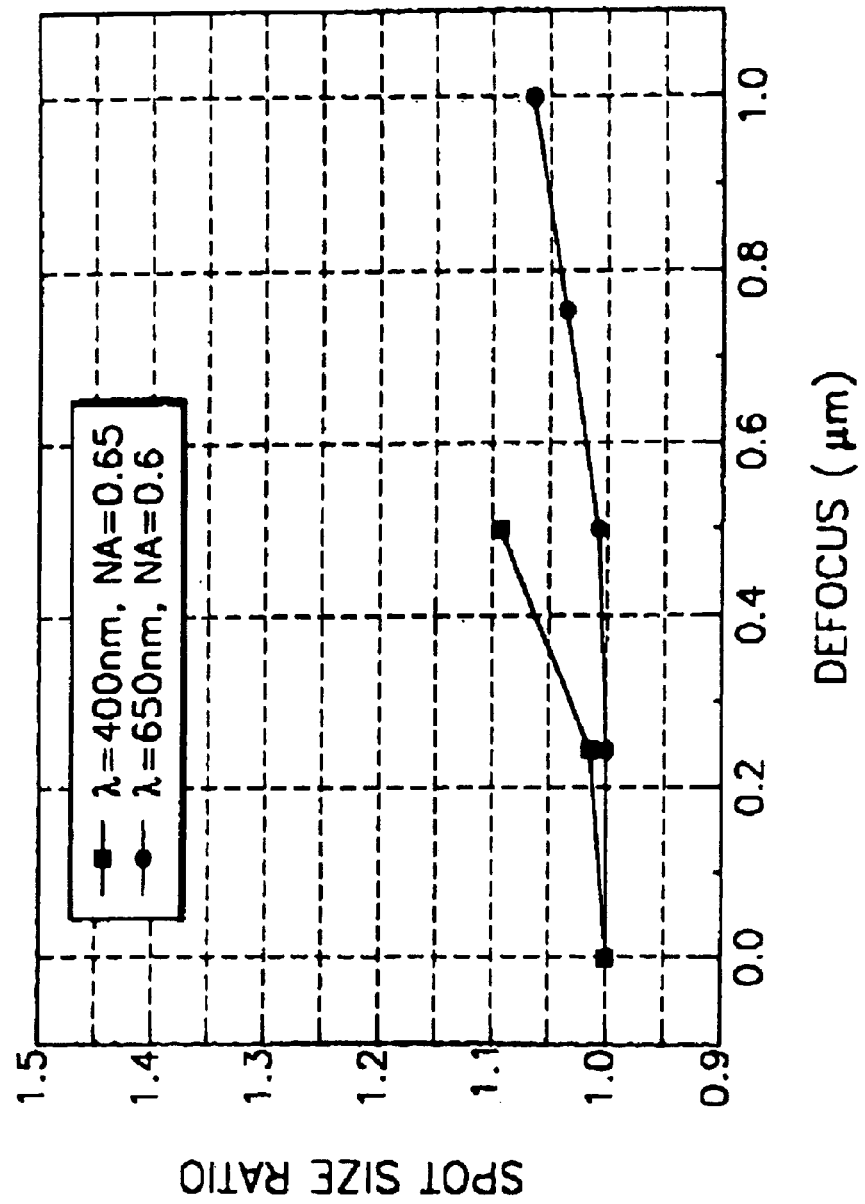
FIG. 7 illustrates changes in spot size with respect to defocus.
Figure 8:
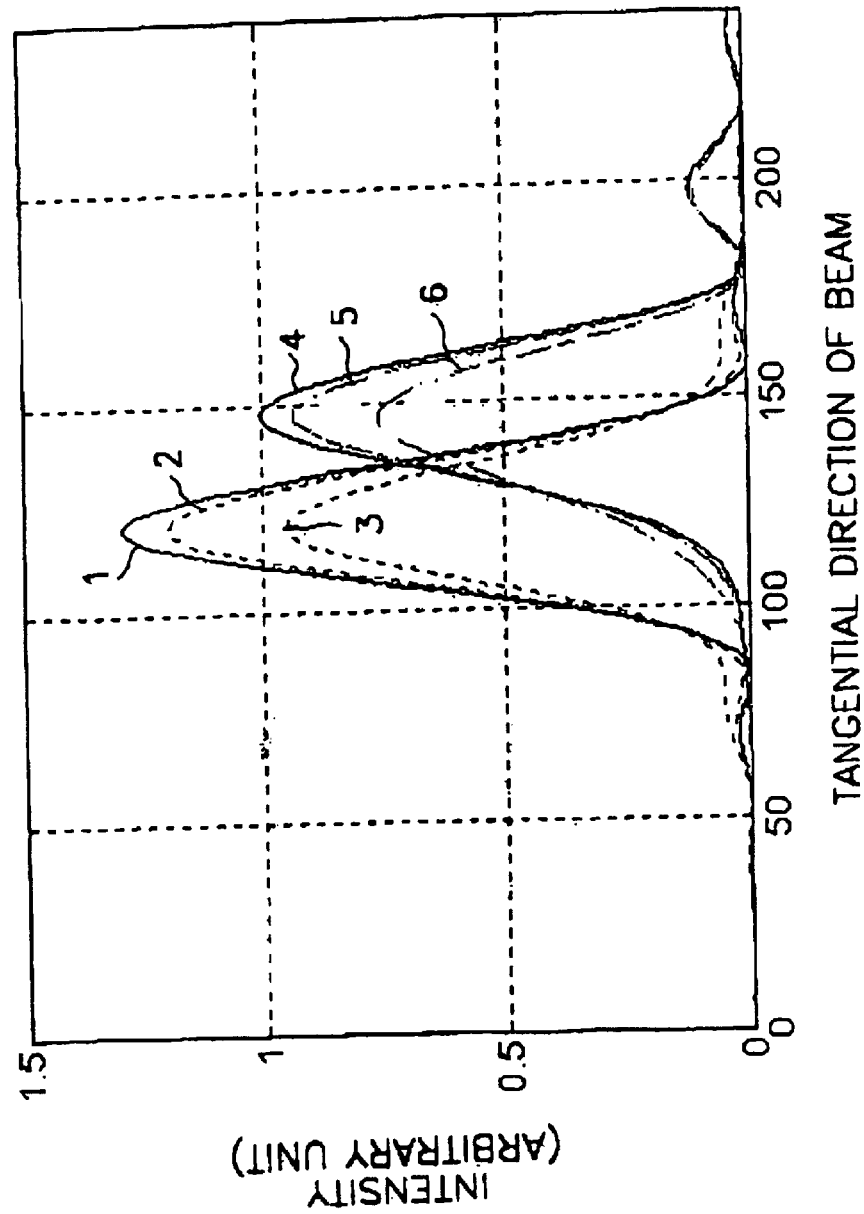
FIG. 8 illustrates changes in beam profile when defocus and tilt occur at the same time.
Figure 9:
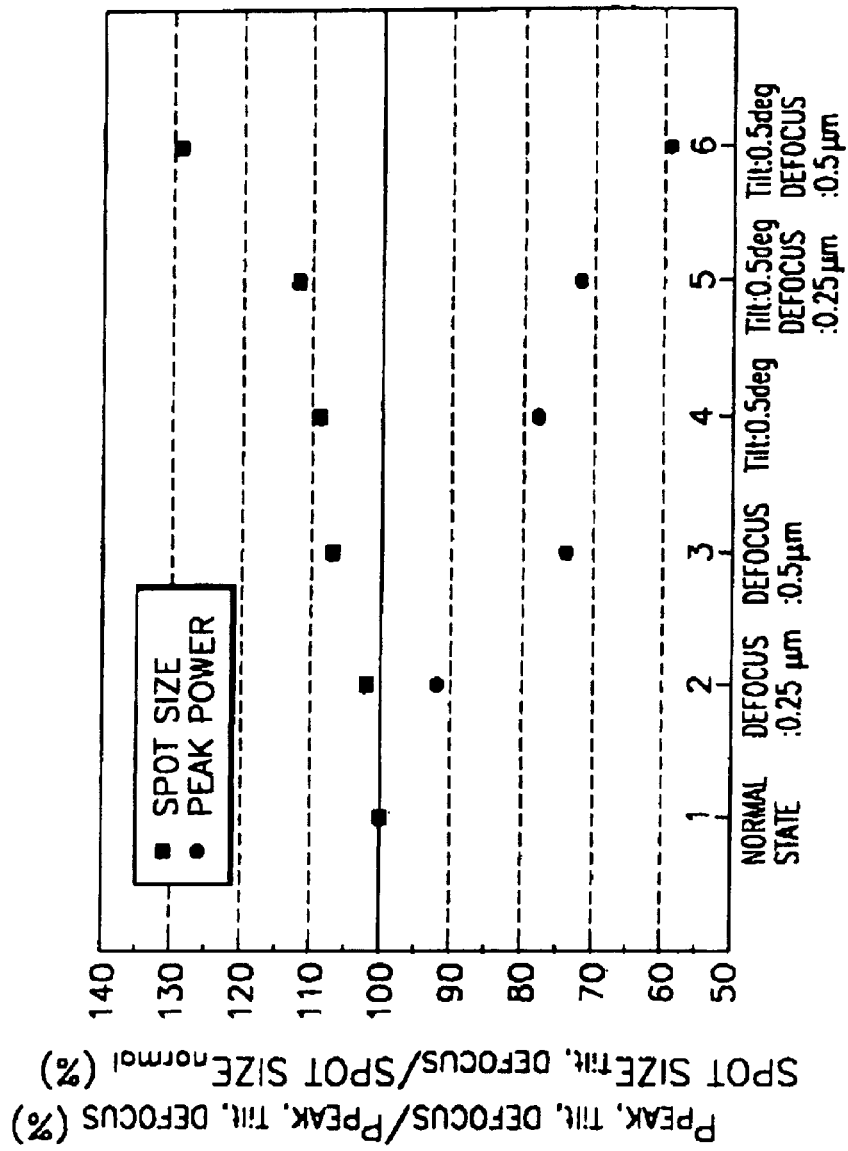
FIG. 9 illustrates changes in the beam spot size and peak intensity when the defocus and tilt occur at the same time.

In addition, as shown in FIG. 6, when tilt and/or defocus occurs, the peak intensity of incidence beam at a wavelength of 400 nm decreases rapidly, and therefore, requiring compensation of the write power. Also, as shown in FIG. 7, the increase in beam spot size is insensitive to tilt and/or defocus at a wavelength of 650 nm, while the beam spot size decreases rapidly at a wavelength of 400 nm with respect to tilt and/or defocus. FIG. 9 shows that such a result is more prominent when defocus and tilt occur together. Therefore, if defocus occurs, beam peak intensity decreases and beam spot size increases, causing the power density to decrease. This is the same result as that produced by tilt.

Figure 16:
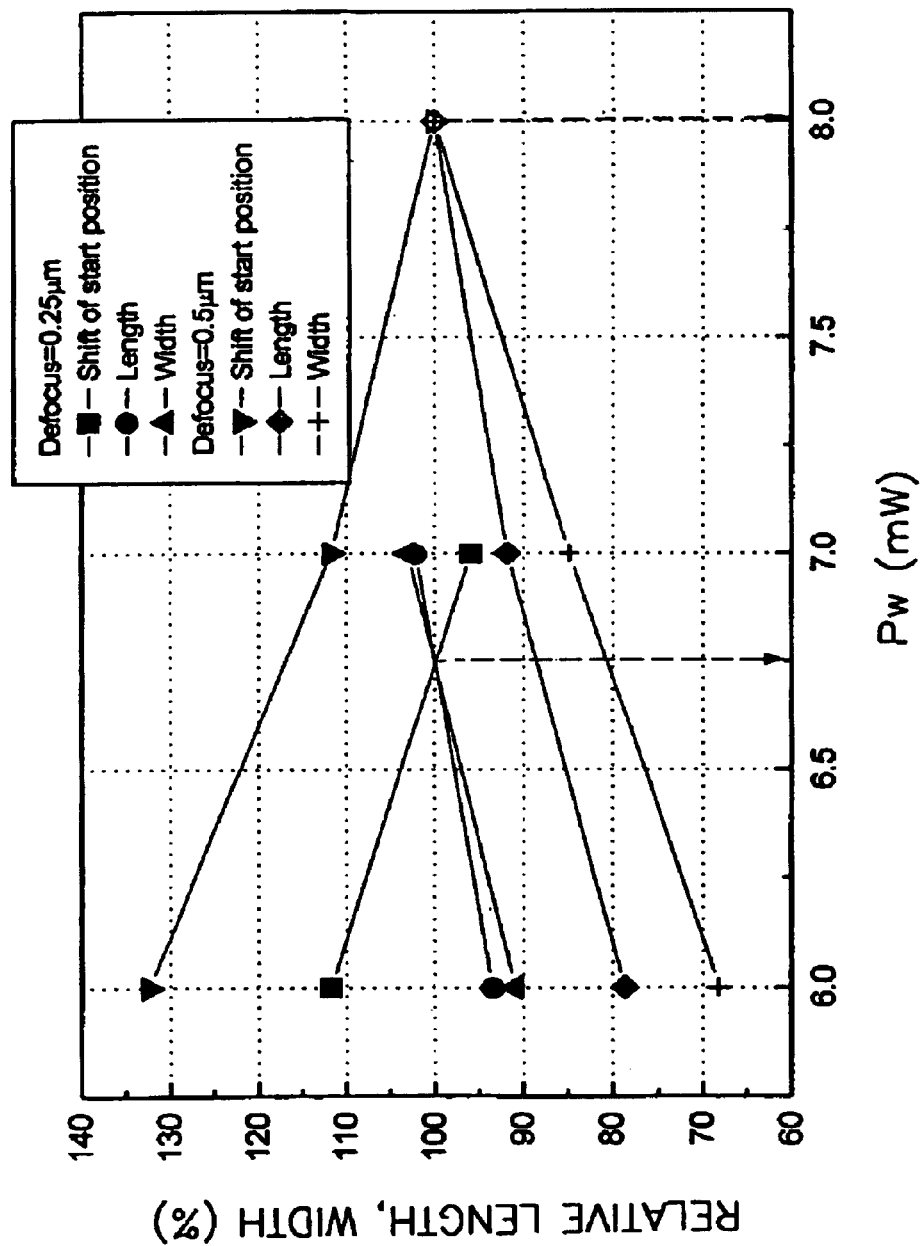
FIG. 16 illustrates the compensation effect of write power when the defocus is 0.25 $\mu$m and 0.5 $\mu$m.
Figure 17:
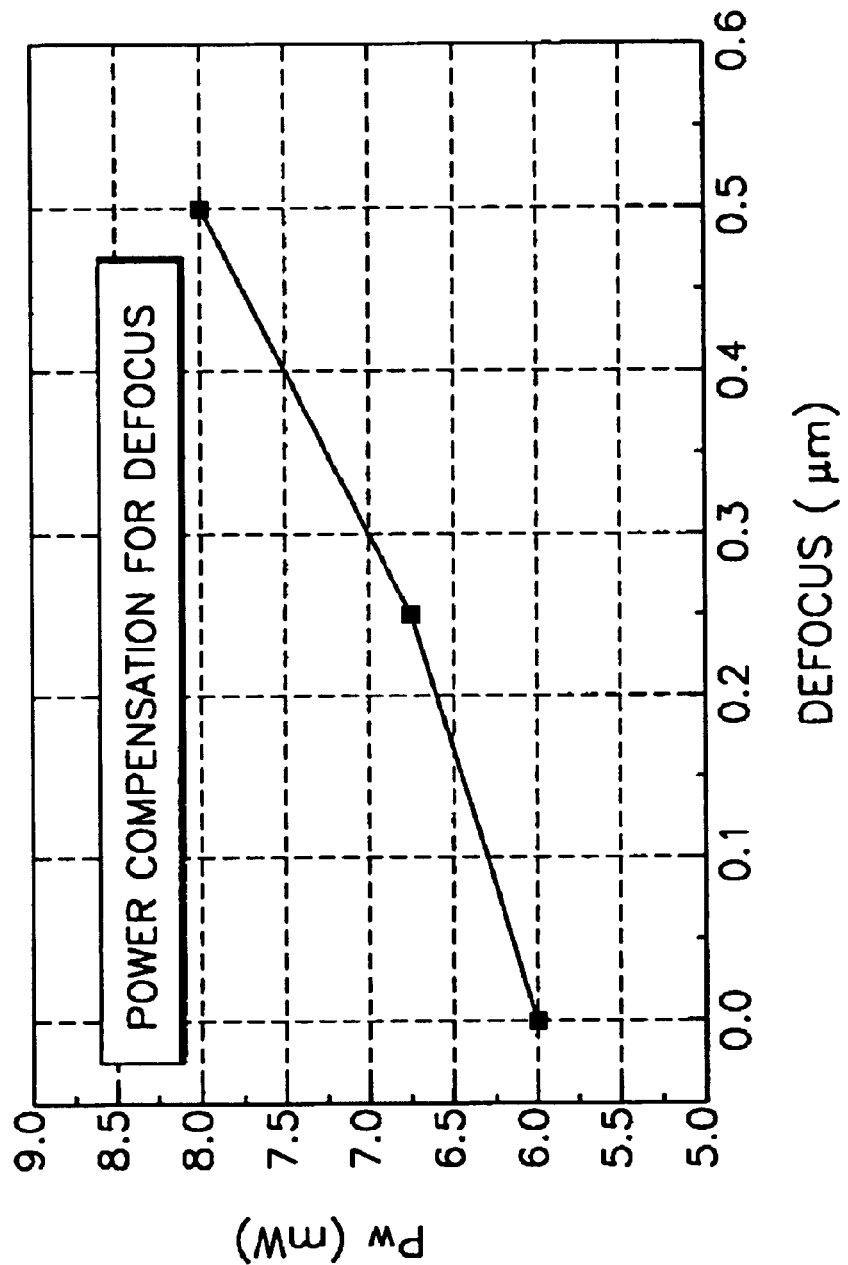
FIG. 17 illustrates compensation write powers with respect to defocus.

The effect of defocus on the incident beam is shown in FIG. 16, which illustrates changes in defocus with respect to the shape of mark (the length and width of a recording mark) for each write power for wavelengths 650 nm and 400 nm, respectively. As compared to a normal state, the length and width of a recorded mark both decrease as defocus increases when the write power is 6 mW. However, when the decreased length and width of a recording mark due to defocus are compensated for by write power, the same shape as the normal-state mark can be obtained when defocus is 0.25 μm and write power is 6.75 mW, or when defocus is 0.5 μm and write power is 8 mW. Therefore, as shown in FIG. 17, a desired recording mark, that is a recording mark without defocus, can be recorded by using an amount of write power which compensates for the defocus.

FIG. 18 is a table showing the result of measuring the amount of shift of a recording location, and the length of a recording mark and width of a recording mark when tilt is zero, when tilt is 0.5°, and when tilt is 0.5° and defocus is 0.25 μm. Each value is obtained by increasing write power from the 6 mW normal write power in steps of 1 mW. When tilt is zero, there is no need for a write power higher than 6 mW since this is the optimum write power. Similarly, when tilt is 0.5°, there is no need for a write power higher than 8 mW.

Figure 19:
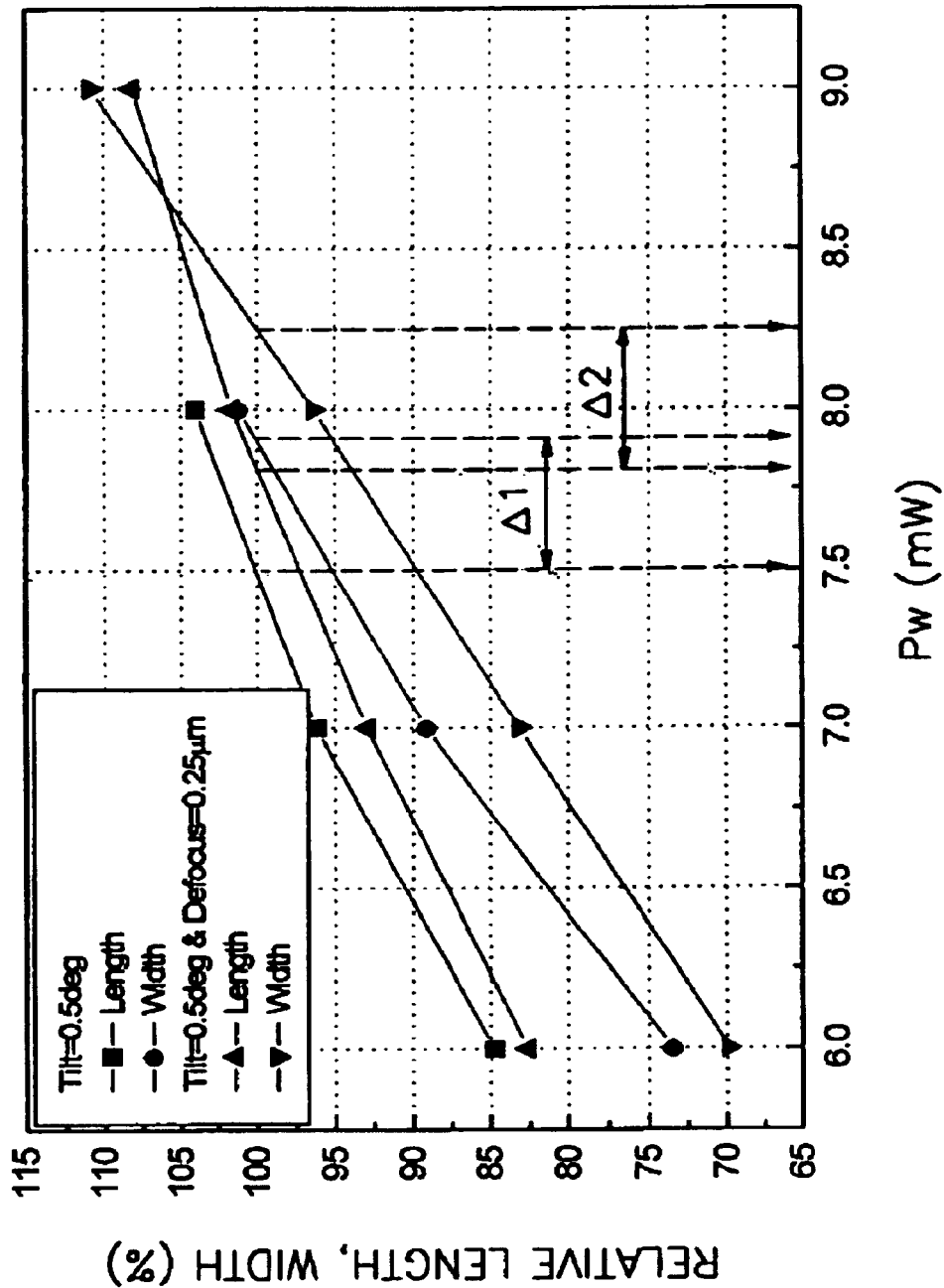
FIG. 19 illustrates the compensation effect of write power when the tilt is 0.5°, and when the tilt is 0.5° and the defocus is 0.25 $\mu$m.

FIG. 19 illustrates changes in the length and width of a recording mark with respect to write power when tilt is 0.5°, and when tilt is 0.5° and defocus is 0.25 μm, based on the results in FIG. 18. This figure shows that the difference between the write power required to obtain a normal-state recording mark width and length when tilt is 0.5° (Δ1), is almost the same as the difference between write power required for obtaining the normal-state recording mark width and length when tilt is 0.5° and defocus is 0.25 μm (Δ2).

Figure 20:
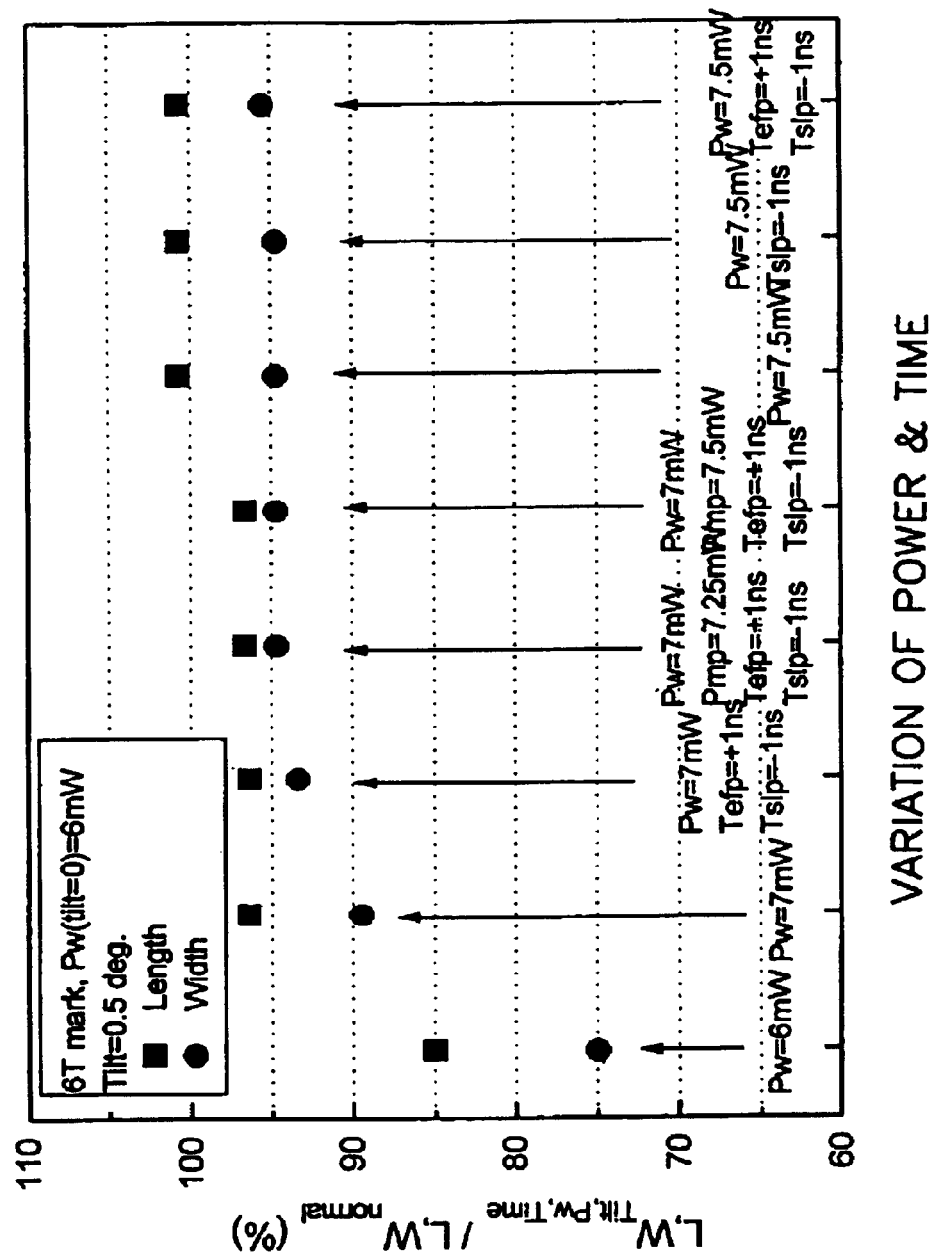
FIG. 20 illustrates the compensation effect with respect to write power and write time when the tilt is 0.5°.

FIG. 20 illustrates the compensation effected by write time as well as write power when only tilt occurs based on the result in FIG. 19. The figure shows that compensation can be effectively performed when the length of a recording mark is compensated by adjusting the write power, and the width of a recording mark is compensated by adjusting the write time. In particular, compensation can be performed using the ending time of the first pulse ($T^{EFP}$) and/or the starting time of the last pulse ($T_{SLP}$) of recording pattern shown in FIG. 21B. In addition, when tilt is compensated by only using write power, the length of a recording mark is adjusted by write power, as described above, and the width of a recording mark can be compensated by adjusting the write power of a multi-pulse chain located between the first pulse and the last pulse.

Figures 21A, 21B:
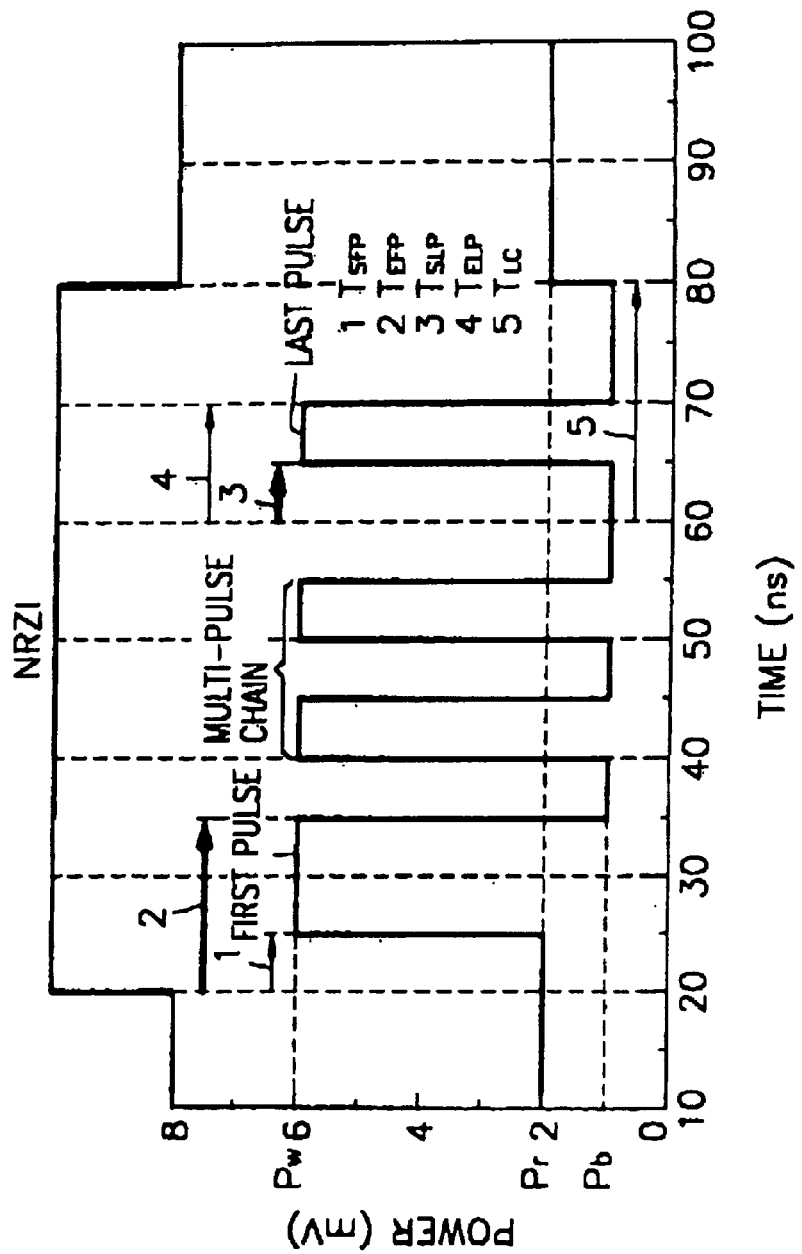
FIG. 21A and FIG. 21B illustrate recording patterns of a write pulse used in tilt and/or defocus compensation according to the present invention.

In addition, for non return to zero (NRZI) input data, as shown in FIG. 21A, write pulses in FIG. 21B are generated and then recorded on a disc. FIG. 21B shows the starting time of the first pulse ($T_{SFP}$), the ending time of the first pulse ($T_{EFP}$), the starting time of the last pulse ($T_{SLP}$), the ending time of the last pulse ($T_{ELP}$), and a cooling pulse period ($T_{LC}$). Also shown are write power $P_W$ (i.e. peak write power), read power ($P_r$), and bias power ($P_b$) (i.e. erase power). In addition, FIG. 21B shows the NRZI data as including marks and spaces, with the laser diode being off during the spaces. When a disc is a digital versatile disc (DVD), each mark of NRZI data has a length of 3T, 4T, . . . , 14T, with T being 1-bit length. The NRZI data is recorded only by changing the number of multi-pulses without changing the first pulse, the last pulse, and a cooling pulse.

That is, the recording pattern according to a DVD specification includes the first pulse, a multi-pulse chain, and the last pulse. The first rising edge of the first pulse of basic recording pulses occurs a predetermined time after the rising edge of a recording mark. The rising edge of the first pulse can be shifted before and after in units of 1 nanosecond (ns). The rising edge of the last pulse can be shifted also before and after in units of 1 ns. A multi-pulse chain is divided into a plurality of short pulses to reduce accumulation of a heat at the latter part of a recording mark in order to prevent the occurrence of deformation in a recording mark. Therefore, when NRZI input data are recorded as marks and spaces on a disc using a recording pulse having the recording pattern shown in FIG. 21B, the starting point of a recorded mark is shifted by beam shift due to tilt. To compensate for this, the recording pattern must be shifted with respect to tilt.

FIG. 22 shows changes in the recording pattern shown in FIG. 21B with respect to tilt. These changes include changes in the recording location, the shift amount, and the recording mark length and the width with respect to tilt and write power. FIG. 22 shows that, as tilt increases, the amount by which the recording location of a recording mark is shifted increases and the length and width decrease. In addition, as write power increases for the same tilt, the amount by which the recording location of a recording mark is shifted decreases and the length and width increase. As shown in FIG. 22, when tilt is zero, there is no need for a write power higher than 6 mW, and when tilt is 0.5°, there is similarly no need for a write power higher than 8 mW. In addition, when tilt is 1.0°, recording cannot be performed with a write power of 6 mW or 7 mW.

Figure 23:
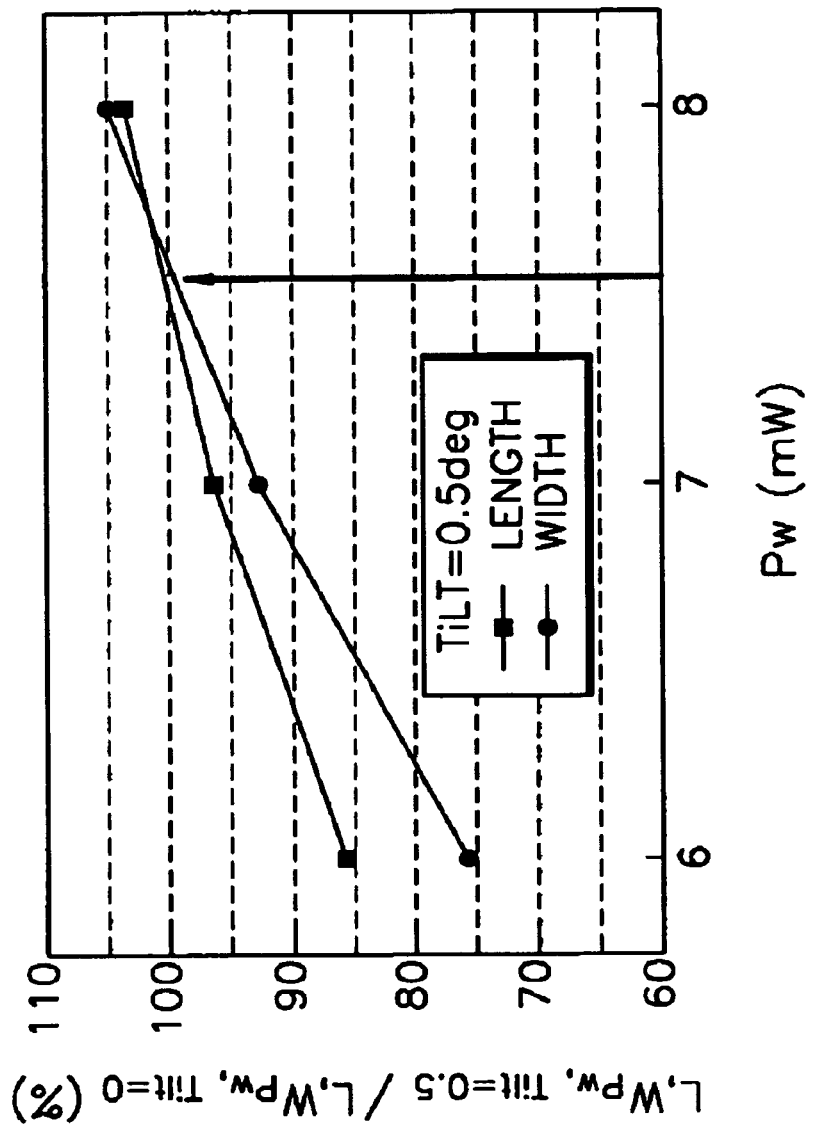
FIG. 23 illustrates the compensation effect of the length of a recording mark and width of a recording mark by write power when the tilt is 0.5°.

FIG. 23 shows the compensation effect of a recording pattern (i.e. the length and the width of a recording mark) by write power when tilt is 0.5°, based on the result in FIG. 22, with the length and width normalized with respect to length and width for a write power of 6 mW and a tilt of 0°. FIG. 23 shows that when tilt occurs, the length and the width of a recording mark increase as write power increases, and the length of a recording mark is effectively compensated for write power. For example, when write power is 6 mW, the length of a recording mark corresponds to 85% of the normal value and the width of a recording mark corresponds to 75% of the normal value. Therefore, for the same write power, the compensation is more effective as to the length than as to the width.

Figure 24:
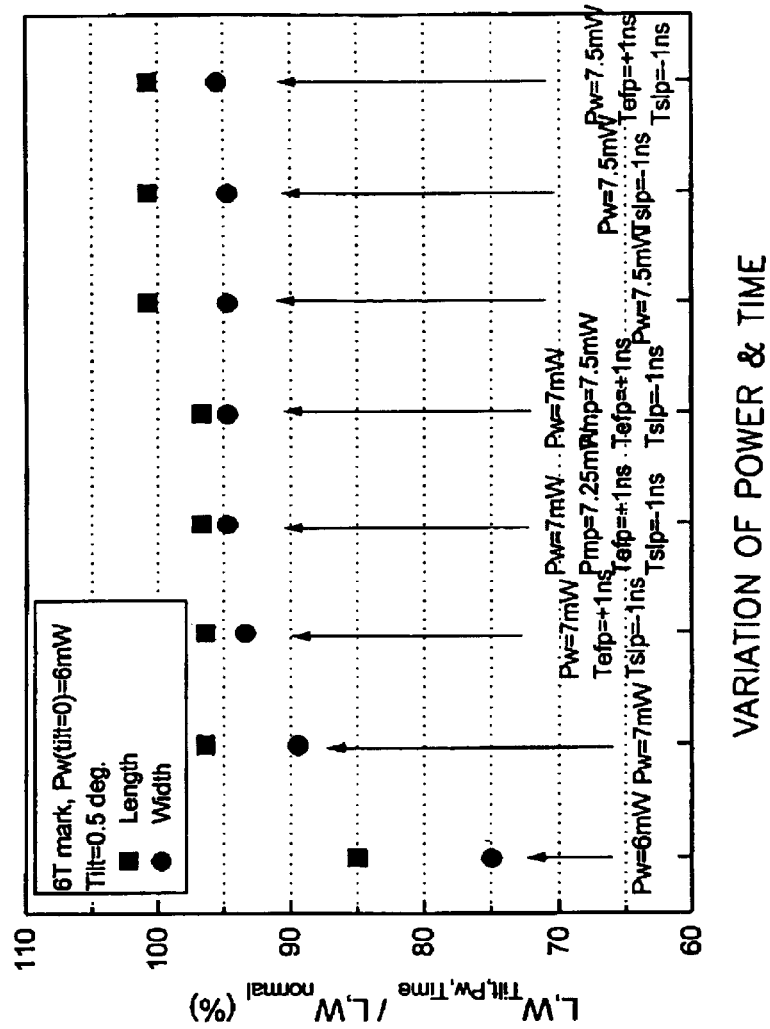
FIG. 24 illustrates the compensation effect of the length of a recording mark and width of a recording mark with respect to changes in the write power and write time when the tilt is 0.5°.

FIG. 24 illustrates the compensation effect of the recording pattern by write time as well as write power when tilt is 0.5°, based on the result in FIG. 23. The figure shows that compensation for the length of a recording mark can be effectively adjusted by write power, while compensation for the width of a recording mark can be effectively adjusted by write time. In particular, the compensation of the width is performed using the ending time of the first pulse ($T_{EFP}$) and/or the starting time of the last pulse ($T^{SLP}$) of the recording pattern shown in FIG. 21B. In addition, when tilt is compensated only by adjusting the write power, the width of a recording mark can be compensated by adjusting the write power of the multi-pulses located between the first pulse and the last pulse.

In addition, by storing, in advance, data on the write power and/or write time needed to compensate for the shift amount of the recording pattern, and the length and the width of a recording mark with respect to tilt based on the result in FIG. 22 in memory, compensation can be adaptively performed based on a detected tilt. In addition, the memory can store data on write power and/or write time to compensate for the shift amount of the recording pattern, and the length and the width of a recording mark according to the recording pattern (the length of a recording mark) of input data as well as tilt.

Figure 25:
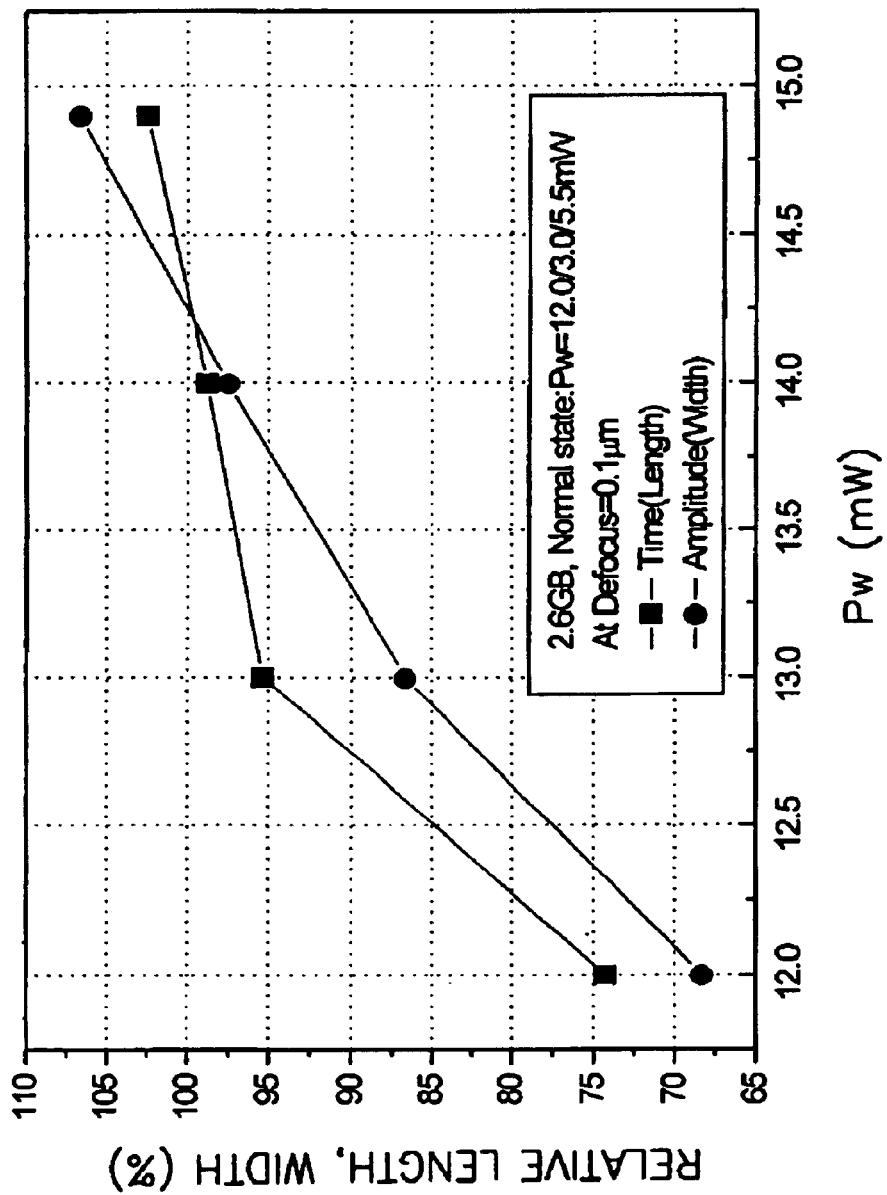
FIG. 25 illustrates the recording compensation effect when the defocus is 1 $\mu$m in a 2.6 GB digital versatile disc-random access memory (DVD-RAM)

FIG. 25 is the result of an experiment to compensate, by write power, for a detected defocus using a 2.6 GB DVD-RAM. FIG. 25 shows the same tendency as the result of simulation in FIG. 16. The power of a 2.6 GB DVD-RAM in a normal state is 12 mW (write power), 3.0 mW (bias power), 5.5 mW (read power). When 0.1 $\mu$m defocus occurs, the length and the width of a recording mark are compensated by an increase in the write power.

Figure 26:
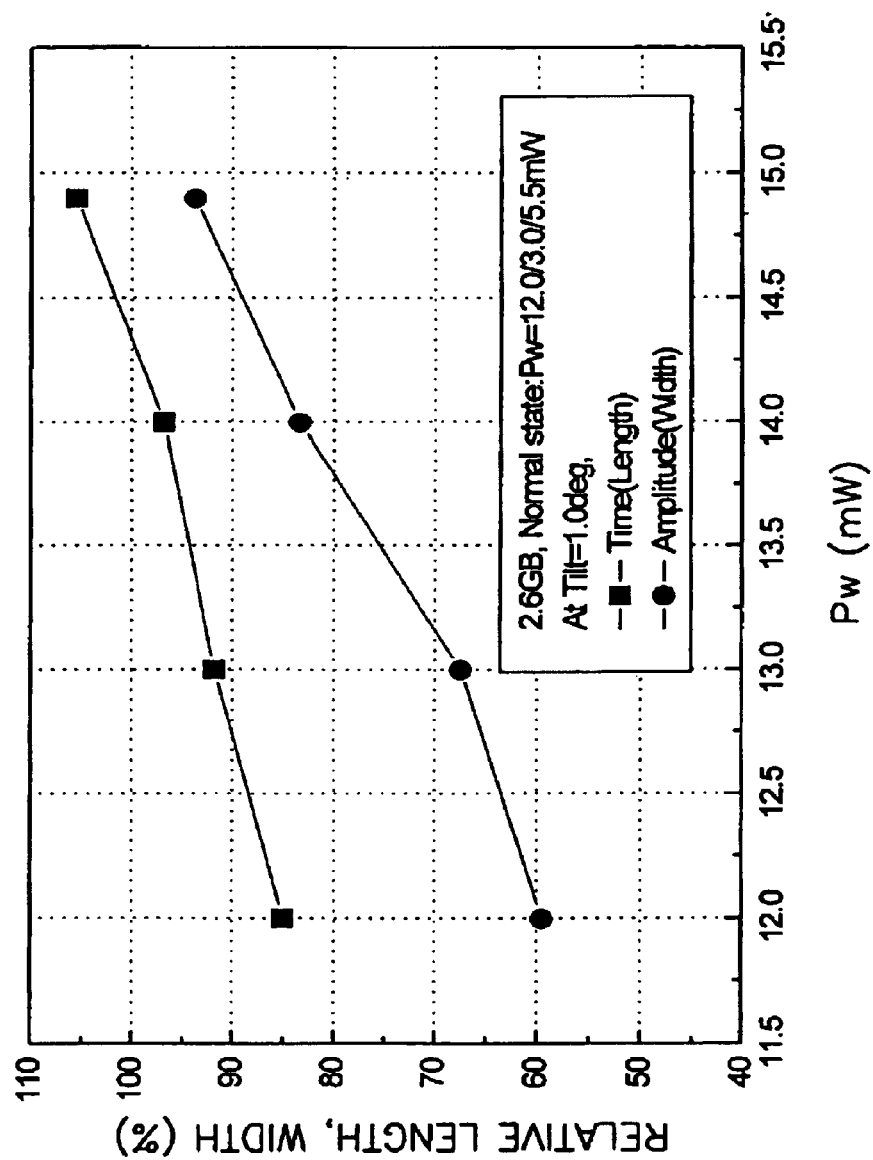
FIG. 26 illustrates the recording compensation effect when the tilt is 1.0° in a 2.6 GB DVD-RAM.

FIG. 26 shows changes in the length and the width of a recording mark with respect to compensation by write power when a tilt of 1° occurs, using the same 2.6 GB DVD-RAM as the disc in FIG. 25. The figure shows that when tilt occurs, the length and the width of a recording mark are compensated by controlling the write power.

Figure 27:
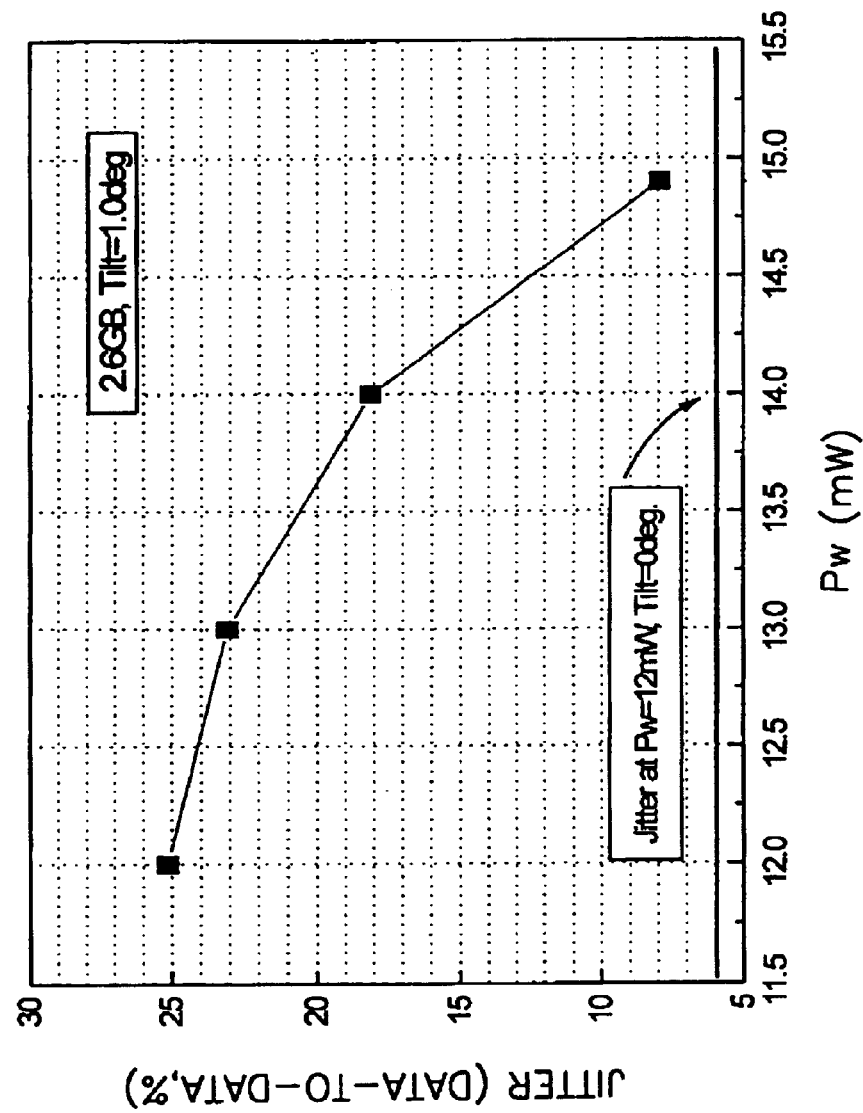
FIG. 27 illustrates change in jitters with respect to the recording compensation effect when the tilt is 1.0° in a 2.6 GB DVD-RAM.

FIG. 27 shows the change in jitter with respect to power both without tilt, and with a tilt of 1°. In a normal state where tilt does not occur, jitter hardly occurs even as write power increases. However, when there is tilt, the jitter amount decreases as write power increases.

In conclusion, when only defocus occurs, it can be compensated for by only adjusting write power. However, when defocus and tilt occur together, the shift of beam by tilt is compensated for by shifting the entire recording pattern, the length of a recording mark is compensated for by adjusting write power, and the width of a recording mark is compensated for by adjusting write time and particularly by the ending time of the first pulse ($T_{EFP}$) and/or the starting time of the last pulse ($T_{SLP}$) in the recording pattern. In addition, when defocus and tilt are compensated for only by adjusting write power, the length of a recording mark is adjusted by write power, the width of a recording mark can be adjusted by write power of multi-pulses located between the first pulse and the last pulse.

Figure 28:
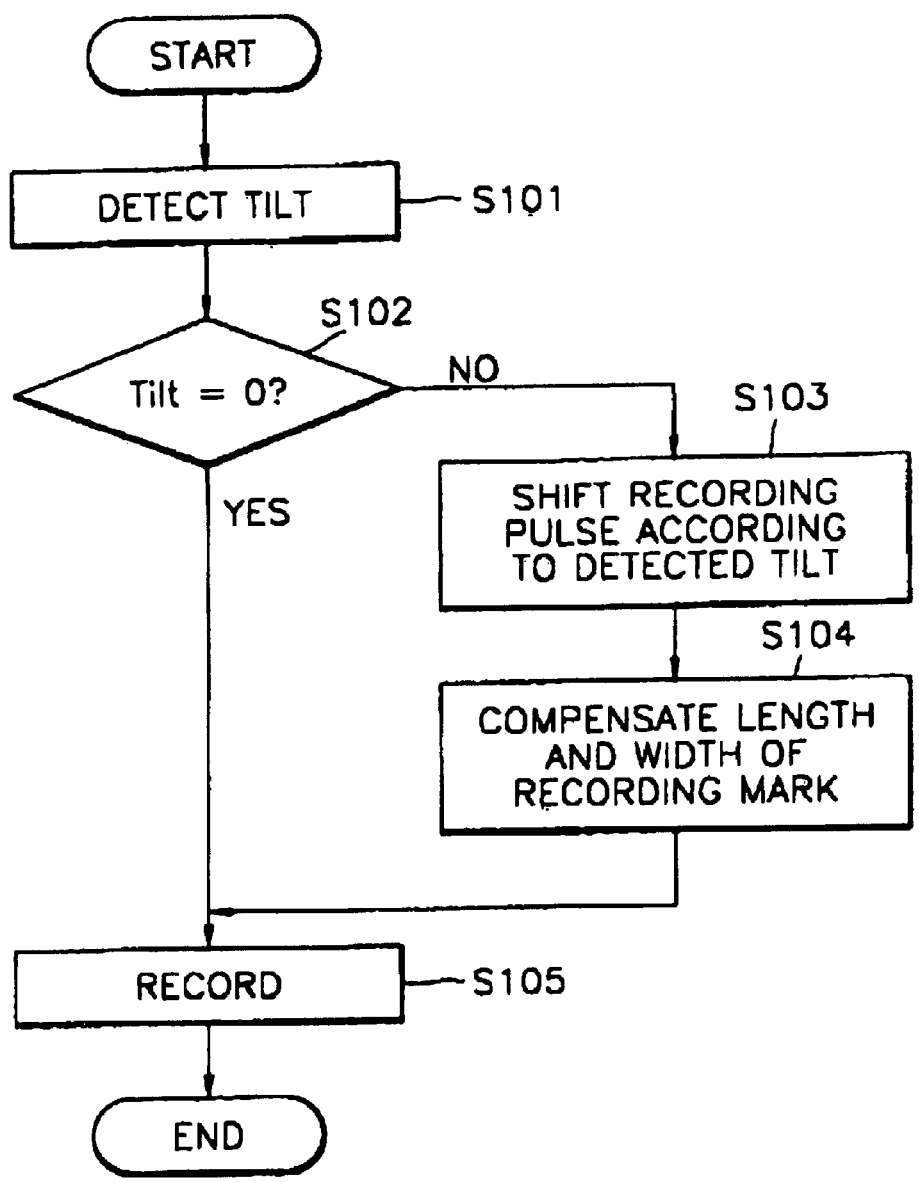
FIG. 28 is a flowchart of a tilt compensation method according to an embodiment of the present invention.

FIG. 28 is a flowchart of a method of compensating for tilt according to an embodiment of the present invention. In step S101, tilt is detected, and in step S102, it is determined whether or not tilt is zero (tilt=0°). While not shown, step S102 could also determine whether or not tilt is α° by considering the margin of tilt (α°).

In step S103, when detected tilt is not zero, the recording pattern of the write pulse is shifted in the direction for compensating for tilt. The length and the width of a recording mark are compensated so that the effect of tilt is nearly eliminated in step S104. In step 104, compensation for the length of a recording mark is provided by adjusting the write power, and the compensation of the width of a recording mark is provided by adjusting the write time, and particularly by the ending time of the first pulse ($T_{EFP}$) and/or the starting time of the last pulse ($T_{SLP}$) in the recording pattern. In addition, when tilt is compensated only by adjusting write power, the length of a recording mark is adjusted by write power, the width of a recording mark can be adjusted by write power of the multi-pulses located between the first pulse and the last pulse.

In step S105, when tilt is zero in step S102, recording is performed by maintaining the power and write time required for recording, which are supplied to a laser diode. However, when tilt is not zero at step S102, recording is performed by applying to a laser diode a write pulse that has write power and/or write time required for recording with respect to detected tilt supplied in the step S104.

In steps S103 and S104, the required shift amount, write power and/or write time can adaptively compensate for the detected tilt by storing, in a memory, data on the write power and/or write time required to compensate the shift amount of the recording pattern, and the recording mark length and the width based on input data of either the tilt or the length of a recording mark.

Figure 29:
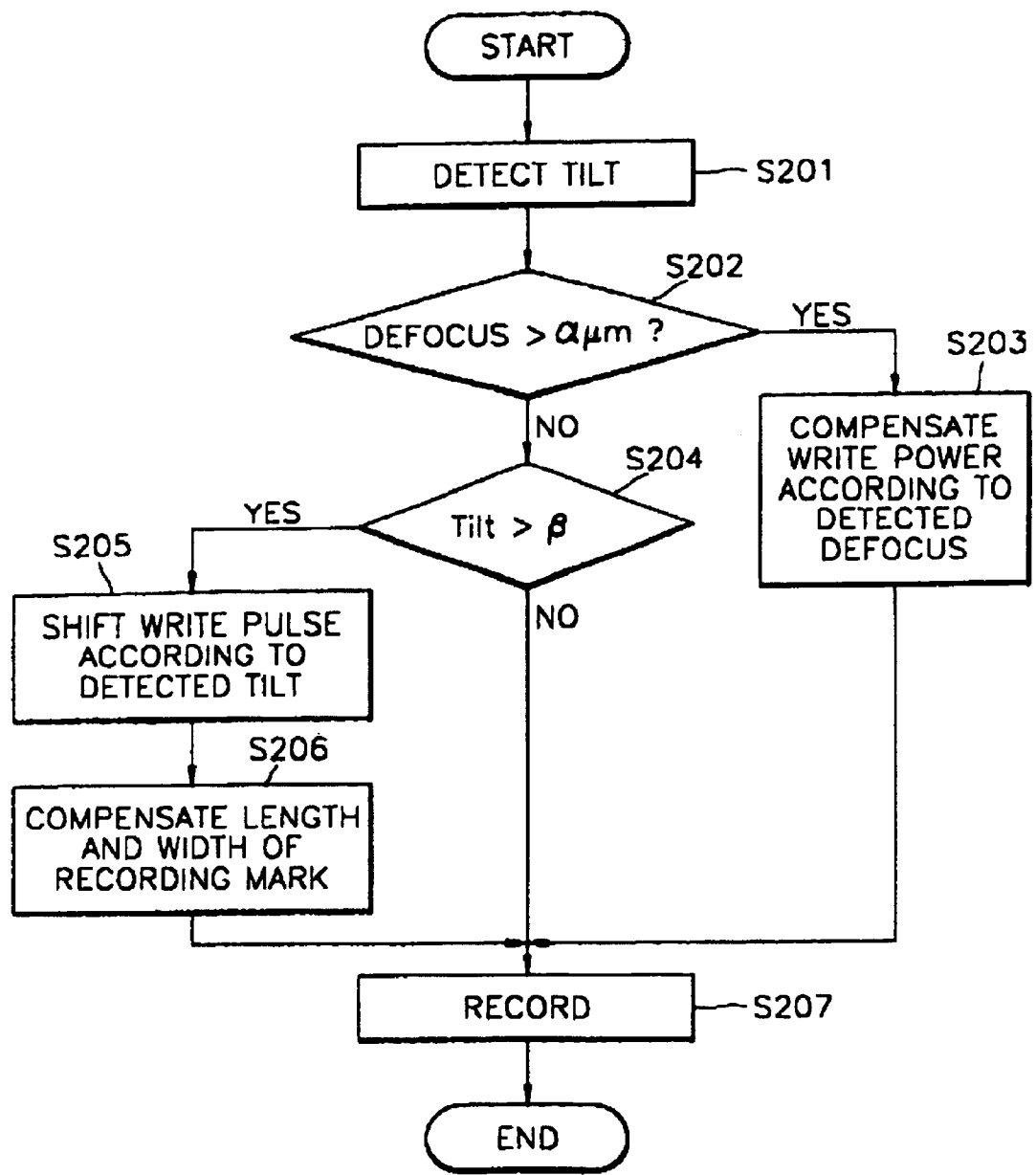
FIG. 29 is a flowchart of a tilt and defocus compensation method according to another embodiment of the present invention.

FIG. 29 is a flowchart of a method of compensating for tilt and/or defocus according to another embodiment of the present invention. In step S201, tilt and/or defocus is detected, and in step S202, it is determined whether or not the detected defocus is equal to or less than a predetermined margin (α μm).

When the result in step S202 indicates that the detected defocus is greater than a defocus predetermined margin (α μm), write power is adjusted with respect to the detected defocus in step S203. When the result in step S202 indicates that detected defocus is equal to or less than the defocus predetermined margin (α μm), it is then determined in step S204 whether or not the detected tilt in step S201 is equal to or less than a tilt predetermined margin (β°).

When the result in step S204 indicates that tilt is greater than the tilt predetermined margin (β°), the recording pattern of a write pulse is shifted in a direction that is opposite to the direction shifted due to the detected tilt in step S205, and the length and the width of a recording mark are compensated in step S206, nearly eliminating the effect of the detected tilt. In step 206, compensation of the length of a recording mark is provided by adjusting the write power. Compensation of the width of a recording mark is provided by adjusting the write time, and particularly, by the ending time of the first pulse ($T_{EFP}$) and/or the starting time of the last pulse ($T_{SLP}$) in the recording pattern. In addition, when tilt is compensated for only by adjusting write power, the length of a recording mark is compensated by adjusting the write power as described above, and the width of a recording mark is compensated by adjusting the write power of the multi-pulses located between the first pulse and the last pulse.

In step S207, when both defocus and tilt are equal to or less than the defocus predetermined margin (α μm) and the tilt predetermined margin (β°), recording is performed by maintaining the power and write time required for recording, which are supplied to a laser diode. Otherwise, recording is performed by applying to the laser diode either a write pulse that has the write power compensated with respect to defocus detected in step S203, or a write pulse having a power and/or time required for recording to compensate the recording mark with respect to the detected tilt.

In step 203, the write power required to compensate for defocus and the required shift amount, as well as the write power and/or write time in steps S205 and S206, can adaptively compensate with respect to the detected tilt and/or defocus by storing, in a memory, data on the write power and/or write time required to compensate for the shift amount of the recording pattern, and the length and the width of a recording mark using the detected tilt or the length of a recording mark as input data. In addition, the memory can both store the write power and/or write time, and the amount of shift required for recording to correspond to both a case where defocus and tilt occur together, and a case where defocus or tilt occurs.

Figure 30:
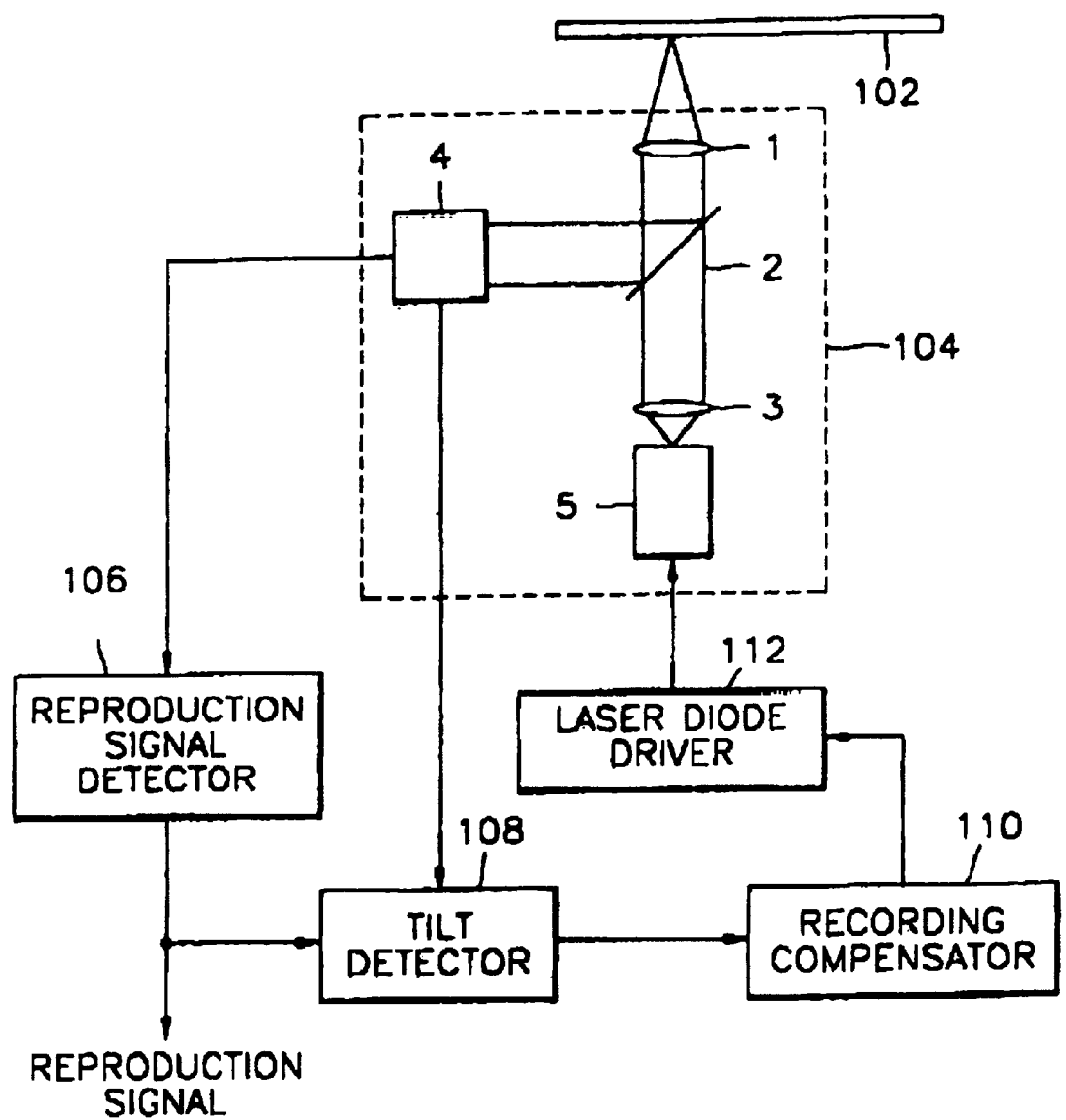
FIG. 30 is a block diagram of a tilt compensation apparatus according to an embodiment of the present invention.

FIG. 30 is a block diagram of an apparatus to compensate for tilt according to an embodiment of the present invention. Shown in FIG. 30 are an optical disc 102, a pick-up unit 104, a reproduction signal detector 106, a tilt detector 108, a recording compensator 110, and a laser diode driver 112. The pick-up unit 104, which drives an optical disc 102, includes typical mechanisms for an optical system, which includes an objective lens 1, a half mirror 2, a collimator lens 3, a photo detector 4, a laser driver 5, and, though not shown in the figure, an actuator for focusing and tracking.

In the shown embodiment, the laser diode wavelength of the pick-up unit 104 is equal to or less than approximately 430 nm, which is the wavelength for blue light. In addition, when the thickness of a disc substrate is equal to or greater than 0.3 mm, the NA of the objective lens 1 is equal to or greater than 0.6, and when the thickness of a disc substrate is equal to or less than 0.3 mm, the NA of an objective lens 1 is equal to or greater than 0.7.

The reproduction signal detector 106 detects a reproduction signal in the output signal of the photodetector 4. The tilt detector 108 detects tilt of an optical disc 102, using the reproduction signal supplied by the reproduction signal detector 106 or the output signal of the photodetector 4. The shown tilt detector 108 can be used only for detecting tangential tilt.

The recording compensator 110 generates a recording pulse earlier than it would otherwise be generated to compensate for the amount of shift due to tilt, which is detected by the tilt detector 108, in order to shift the starting point of a recording mark in the direction in which tilt is compensated. In addition, compensation of the length of a recording mark is provided by adjusting write power, while the width of a recording mark is compensated by adjusting the write time. In the shown embodiment, the width of a recording mark is compensated by using the ending time of the first pulse ($T_{EFP}$) and/or the starting time of the last pulse ($T_{SLP}$) of the recording pattern. In the alternative, when tilt is compensated using only write power, the length of a recording mark is compensated by write power, as described above, and the width of a recording mark can be compensated by adjusting the write power of the multi-pulses located between the first pulse and the last pulse.

In addition, the recording compensator 110 can adaptively compensate for tilt detected in the tilt detector 106 by integrating a memory storing data on the write power and/or write time needed to compensate the shift amount of the recording pattern and the recording mark length and width with respect to tilt. In addition, the data can include the write power and/or write time required to compensate the shift amount of the recording pattern and the recording mark length and width with respect to the length of a recording mark as well as tilt.

The laser diode driver 112 performs recording on the optical disc 102 using the pick-up unit 104 by converting a write pulse signal into a current signal and making the current signal flow through the laser diode 5 during write time with respect to the power level of the write pulse adjusted in the recording compensator 110. That is, when the laser diode is continuously turned on, heat is transferred to the optical disc and the data is recorded as a recording mark.

Figure 31:
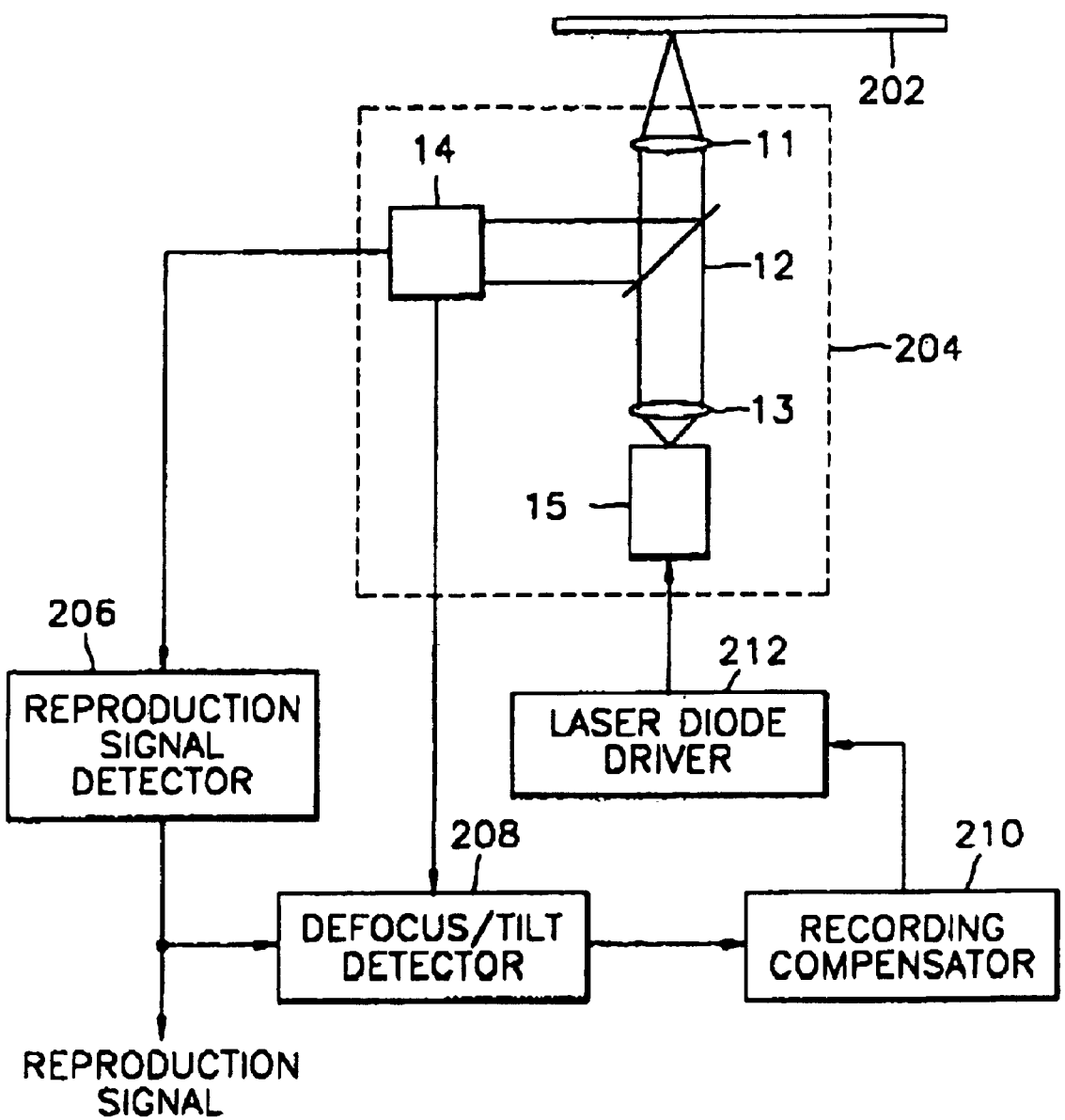
FIG. 31 is a block diagram of a tilt and defocus compensation apparatus according to another embodiment of the present invention.

FIG. 31 is a block diagram of an apparatus for compensating for tilt and defocus according to another embodiment of the present invention. Shown in FIG. 31 are an optical disc 202, a pick-up unit 204, a reproduction signal detector 206, a defocus/tilt detector 208, a recording compensator 210, and a laser diode driver 212. The pick-up unit 204, which drives the optical disc 202, includes typical mechanisms for an optical system, which includes an objective lens 11, a half mirror 12, a collimator lens 13, a photo detector 14, a laser diode 15, and, though not shown, an actuator for focusing and tracking.

In the shown embodiment, the laser diode wavelength of the pick-up unit 204 is equal to or less than approximately 430 nm, the wavelength of blue light. In addition, when the thickness of a disc substrate is equal to or greater than 0.3 mm, the NA of the objective lens 11 is equal to or greater than 0.6, and when the thickness of a disc substrate is equal to or less than 0.3 mm, the NA of an objective lens 11 is equal to or greater than 0.7.

The reproduction signal detector 206 detects a reproduction signal in the output signal of the photodetector 14. The defocus/tilt detector 208 detects defocus and/or tilt using the reproduction signal supplied by the reproduction signal detector 206 or the output signal of the photodetector 14. The shown tilt detector 208 can only be used for detecting tilt in tangential.

The recording compensator 210 generates a write pulse, which uses an adjusted write power to compensate for a defocus detected in the defocus/tilt detector 208, and generates a recording pulse earlier to compensate for the amount of shift due to the detected tilt, in order to shift the starting point of a recording mark when tilt is detected. In the shown embodiment, compensation of the length of a recording mark is adjusted by write power, and compensation of the width of a recording mark is adjusted by write time. In addition, the width of a recording mark is compensated for by using the ending time of the first pulse ($T_{EFP}$) and/or the starting time of the last pulse ($T_{SLP}$) of the recording pattern. In the alternative, when tilt is compensated for only using write power, the length of a recording mark is compensated using write power, as described above, and the width of a recording mark is compensated by adjusting the write power of the multi-pulses located between the first and last pulse in the write pulse.

In addition, the recording compensator 210 can adaptively compensate for tilt and/or defocus detected in the defocus/tilt detector 206 by integrating a memory storing data on write power required for a detected defocus, and write power and/or write time required to compensate the shift amount of the recording pattern, and the length and the width of a recording mark with respect to the tilt or the length of a recording mark in input data.

The laser diode driver 212 performs recording on the optical disc 202 using the pick-up unit 204 by converting a write pulse signal, the write pulse signal having been compensated with respect to power level in the recording compensator 210, into a current signal, and making the current flow through the laser diode 15 during write time. That is, when the laser diode is continuously turned on, heat is transferred to the optical disc and recording data is recorded as a recording mark.

According to the present invention, the power (write power, erase power, etc.) level required for recording must be increased by a predetermined amount with respect to detected tilt and/or defocus. In addition, the write time is adjusted. As a result, a temperature similar to that when there is no tilt and/or defocus can be obtained, and therefore, the desired size (length, width) of a recording mark can be recorded.

As described above, according to the present invention, since recording is compensated by adjusting the power level and/or recording time required for recording with respect to detected tilt and/or defocus, a recording mark having a desired size (length, width) can be recorded, and therefore, the present invention is appropriate for a high-density optical system.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of compensating for a tilt and a defocus of an optical recording medium, the method comprising:

detecting the defocus of the optical recording medium;

compensating a write power level with respect to the detected defocus;

detecting the tilt of the optical recording medium;

compensating the write power level and a write time with respect to the detected tilt so as to shift a recording pattern with respect to the detected tilt; and generating a recording pulse before recording the recording pattern to compensate for an amount of shift of the recording pattern with respect to the detected tilt.

2. The method of claim 1, wherein the compensating of the write power level and the write time with respect to the detected tilt comprises:

shifting the recording pattern with respect to the detected tilt by both an amount that the recording pattern was shifted due to the detected tilt, and in a direction opposite to the direction that the recording pattern was shifted due to the detected tilt; and adjusting the write power level and the write time required for recording with respect to the detected tilt in order to compensate for a size of a recording mark corresponding to the recording pulse.

3. The method of claim 2, wherein the write power level is adjusted to compensate a length of the recording mark, and the write time is adjusted to compensate a width of the recording mark.

4. The method of claim 3, wherein adjusting the recording mark width comprises adjusting an ending time of a first pulse and/or a starting time of a last pulse of the recording pattern.

5. The method of claim 1, wherein the compensating of the write power level and the write time with respect to the detected tilt comprises:

adjusting the write power level to compensate a length of a recording mark corresponding to a recording signal, and adjusting the write time of a multi-pulse chain of the recording pattern to adjust a width of the recording mark.

6. The method of claim 1, wherein the detected defocus and the detected tilt are detected using a light beam having a wavelength of roughly 430 nm or less.

7. A method for compensating input data for a tilt and/or a defocus of an optical recording medium, which records marks and spaces by write pulses having a recording pattern, the method comprising:

detecting the tilt and the defocus of the optical recording medium;

generating the write pulses before recording the recording pattern to compensate for an amount of shift of the recording pattern with respect to the detected tilt; and adaptively compensating the recording pattern with respect to the detected tilt and/or defocus using a memory, wherein the memory stores data comprising a write power level to compensate with respect to the detected defocus, and the write power level and a write time required for recording to compensate for an amount of shift of the recording pattern, and to compensate for a length and a width of a recording mark with respect to the detected tilt and/or a length of the recording mark.

8. The method of claim 7, wherein the detected defocus and the detected tilt are detected using a light beam having a wavelength of roughly 430 nm or less.

9. An apparatus which records and/or reproduces information on an optical recording medium, and which compensates for tilt and/or defocus, the apparatus comprising:

a tilt and/or defocus detector which detects the tilt and the defocus of the optical recording medium; and a recording compensator which compensates a write power level and/or a write time of a recording pulse with respect to the detected tilt and defocus using a predetermined scheme to adjust a length and a width of a recording mark according to the detected tilt and/or defocus, and the recording compensator generates the recording pulse before recording the recording pattern to compensate for an amount of shift of the recording pattern with respect to the detected tilt, wherein the recording pulse comprises a predetermined recording pattern.

10. The apparatus of claim 9, wherein, according to the predetermined scheme, said recording compensator adjusts the write power level required for recording the recording pulse with respect to the detected defocus.

11. The apparatus of claim 9, wherein, according to the predetermined scheme, said recording compensator adjusts the write power level and the write time required for recording the recording pulse with respect to the detected tilt.

12. The apparatus of claim 9, wherein said recording compensator adjusts the write power level with respect to the detected defocus and adjusts the write power level and/or the write time of the shifted recording pulse to compensate the length and the width of the recording mark.

13. The apparatus of claim 12, wherein said recording compensator adjusts the write power level required for recording to compensate the length of the recording mark, and adjusts the write time required for recording in order to compensate the width of the recording mark.

14. The apparatus of claim 13, wherein said recording compensator adjusts the write power level to compensate the length of the recording mark, and adjusts the write time at an ending time of a first pulse and/or a starting time of a last pulse to compensate the width of the recording mark.

15. The apparatus of claim 12, wherein said recording compensator adjusts the write power level to compensate the length of the recording mark, and adjusts the write power level of a multi-pulse chain of recording pattern to compensate the width of the recording mark.

16. The apparatus of claim 9, further comprising a luminance source which provides the recording pulse, wherein a wavelength of the luminance source is equal to or less than approximately 430 nm.

17. The apparatus of claim 9, further comprising an objective lens having a numerical aperture greater than or equal to 0.6, and wherein the optical recording medium further comprises a substrate having a thickness greater than or equal to 0.3 mm.

18. The apparatus of claim 9, further comprising an objective lens having a numerical aperture greater than or equal to 0.7, and wherein the optical recording medium further comprises a substrate having a thickness less than or equal to 0.3 mm.

19. An apparatus, which records marks and spaces by write pulses having a predetermined recording pattern, and which compensates input data for bit and/or defocus of an optical recording medium, the apparatus comprising:

a tilt and defocus detector which detects the tilt and defocus of the optical recording medium;

a tilt and defocus compensator which adaptively compensates the predetermined recording pattern with respect to the detected tilt and defocus; and a memory storing data comprising a write power level to compensate with respect to the detected defocus, a write power level and a write time required for recording the marks and spaces in order to compensate an amount of shift of the recording pattern, and to compensate a length and a width of a recording mark with respect to the detected tilt and/or length of the recording mark, a write power level and/or a write time and an amount of shift of the recording pattern required for recording the marks and spaces to compensate when defocus and tilt occur together, and a write power level and/or a write time and an amount of shift of the recording pattern required for recording the marks and spaces to compensate when defocus or tilt occurs.

20. A computer readable medium storing a computer program having instructions which, when executed by a processor, cause the processor to perform a method, the method comprising:

detecting a defocus of an optical recording medium;

detecting a tilt of the optical recording medium; and adaptively compensating a length and a width of a recording signal with respect to the detected defocus and tilt by adjusting a write power level and a write time required for recording with respect to the detected tilt to compensate for a size of a recording mark corresponding to the recording signal, and generating a recording pulse before recording the recording pattern to compensate for an amount of shift of the recording pattern with respect to the detected tilt.

21. The computer readable medium of claim 20, wherein the detected defocus and the detected tilt are detected using a light beam having a wavelength of roughly 430 nm or less.

22. A computer readable medium storing a computer program having instructions which, when executed by a processor, cause the processor to perform a method, the method comprising:

detecting a defocus of an optical recording medium;

compensating a write power level according to the detected defocus using write power level information stored in a memory, wherein the write power level comprises a predetermined recording pattern;

detecting a tilt of the optical recording medium; and generating a recording pulse before recording the predetermined recording pattern to compensate for an amount of shift of the predetermined recording pattern due to the detected tilt.

23. The computer readable medium of claim 22, wherein the compensating of the shift of the recording pattern due to the detected tilt further comprises:

shifting the recording pattern by both an amount that the recording pattern was shifted due to the detected tilt, and in a direction opposite to the direction that the recording pattern was shifted due to the detected tilt; and adjusting the write power level and a write time required for recording with respect to the detected tilt in order to compensate for a size of a recording mark corresponding to a recording signal.

24. The computer readable medium of claim 23, wherein the write power level is adjusted to compensate a length of the recording mark, and the write time is adjusted to compensate a width of the recording mark.

25. The computer readable medium of claim 24, wherein adjusting the recording mark width comprises adjusting an ending time of a first pulse or a starting time of a last pulse of the recording pattern.

26. The computer readable medium of claim 22, wherein the shifting of the predetermined recording pattern of the write pulse according to the detected tilt comprises:

adjusting the write power level to compensate a length of a recording mark corresponding to a recording signal, and adjusting the write power level of a multi-pulse chain of the recording pattern to adjust a width of the recording mark.

27. A method of compensating for defocus and/or tilt of an optical recording medium, the method comprising:

detecting tilt/and or defocus of an optical recording medium;

determining whether the detected defocus is equal to or less than a first predetermined margin;

determining whether the detected tilt is greater than a second predetermined margin;

shifting a recording pattern of a write pulse according to the detected tilt, and compensating a length and width of a recording mark according to the detected tilt.

28. The method of claim 27, wherein the detected defocus and the detected tilt are detected using a light beam having a wavelength of roughly 430 nm or less.

* * * * *

UNITED STATES PATENT AND TRADEMARK OFFICE
CERTIFICATE OF CORRECTION

PATENT NO. : 6,940,797 B1
DATED : September 6, 2005
INVENTOR(S) : Kyung-geun Lee et al.

It is certified that error appears in the above-identified patent and that said Letters Patent is hereby corrected as shown below:

Column 16,
Line 30, change "bit" to -- tilt --.

Signed and Sealed this

Seventeenth Day of January, 2006

JON W. DUDAS
*Director of the United States Patent and Trademark Office*